United States Patent
Deogun et al.

(10) Patent No.: US 11,659,523 B2
(45) Date of Patent: May 23, 2023

(54) QUICK BANDWIDTH PART (BWP) SWITCHING MECHANISM AFTER DATA BURST

(71) Applicant: QUALCOMM INCORPORATED, San Diego, CA (US)

(72) Inventors: Pravjyot Singh Deogun, Bengaluru (IN); Kapil Bhattad, Bangalore (IN); Jing Sun, San Diego, CA (US); Mostafa Khoshnevisan, San Diego, CA (US); Xiaoxia Zhang, San Diego, CA (US); Ahmed Zaki, Bengaluru (IN); Gowrisankar Somichetty, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 125 days.

(21) Appl. No.: 16/987,064

(22) Filed: Aug. 6, 2020

(65) Prior Publication Data
US 2021/0051631 A1   Feb. 18, 2021

(30) Foreign Application Priority Data
Aug. 12, 2019 (IN) .............................. 201941032558

(51) Int. Cl.
*H04W 72/04* (2023.01)
*H04W 72/14* (2009.01)
*H04L 1/18* (2023.01)
*H04L 1/1812* (2023.01)

(52) U.S. Cl.
CPC .......... *H04W 72/04* (2013.01); *H04L 1/1812* (2013.01); *H04W 72/14* (2013.01)

(58) Field of Classification Search
CPC . H04W 72/04; H04W 72/14; H04W 72/0453; H04L 1/1812; H04L 1/1822; H04L 1/1685; H04L 1/1887; H04L 5/001; H04L 5/0053; H04L 5/0098
See application file for complete search history.

(56) References Cited

U.S. PATENT DOCUMENTS

| | | | |
|---|---|---|---|
| 2019/0103954 A1* | 4/2019 | Lee ........................ | H04L 5/001 |
| 2019/0132109 A1 | 5/2019 | Zhou et al. | |
| 2020/0314816 A1* | 10/2020 | Yi ....................... | H04W 72/042 |

(Continued)

FOREIGN PATENT DOCUMENTS

WO    2019136726 A1    7/2019

OTHER PUBLICATIONS

U.S. Appl. No. 62/825,690, filed 2019.*

(Continued)

*Primary Examiner* — Phirin Sam
*Assistant Examiner* — Debebe A Asefa
(74) *Attorney, Agent, or Firm* — Haynes and Boone, LLP

(57) ABSTRACT

Wireless communications systems and methods related to bandwidth part (BWP) switching after data communication are provided. A user equipment (UE) receives, from a base station (BS) in a first bandwidth part (BWP), one or more data bursts and BWP switching information. The UE switches from the first BWP to a second BWP based on the BWP switching information after receiving the one or more data bursts. The UE communicates, with the BS, a communication in the second BWP after the switching.

28 Claims, 18 Drawing Sheets

(56) References Cited

U.S. PATENT DOCUMENTS

2020/0314948 A1  10/2020  Babaei et al.
2021/0076445 A1*  3/2021  Tsai .................... H04W 76/19

OTHER PUBLICATIONS

International Search Report and Written Opinion—PCT/US2020/045503—ISAEPO—dated Oct. 7, 2020.

Mediatek Inc: "Remaining Details on Bandwidth Part Operation in NR", 3GPP Draft, 3GPP TSG RAN WG1 Meeting NR#3, R1-1716202, 3rd Generation Partnership Project (3GPP), Mobile Competence Centre, 650, Route Des-Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339660, 9 Pages, Retrieved from the Internet: URL:http://www.3gpp.org/ftp/Meetings_3GPP_SYNC/RAN1/Docs/ [retrieved on Sep. 17, 2017] section 2.4, p. 4-p. 5.

OPPO: "BWP Operation Impacts for NR-U", 3GPP Draft, 3GPP TSG-RAN WG2 Meeting #106, R2-1905611, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 13, 2019 (May 13, 2019), XP051729114, 4 Pages, Retrieved from the Internet: URL: http://www.3gpp.org/ftp/Meetings%5F3GPP%5FSYNC/RAN2/Docs/R2%2D1905611%2Ezip [retrieved on May 13, 2019] section 2.1, p. 2-p. 3.

* cited by examiner

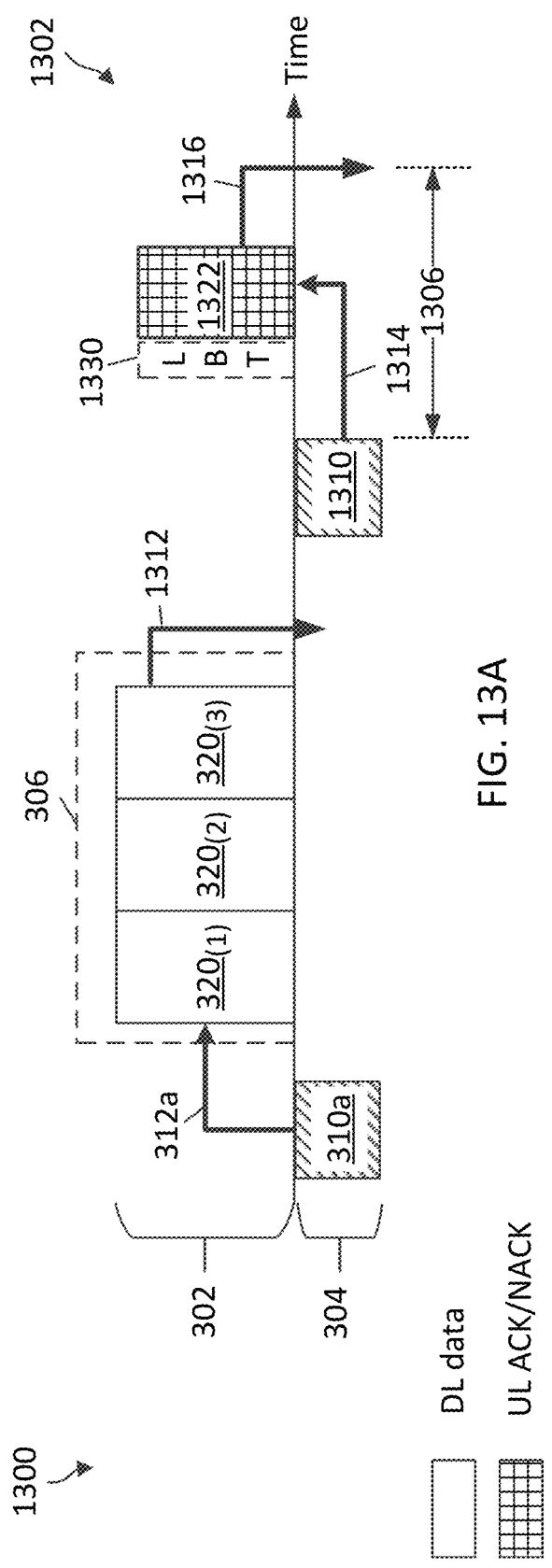
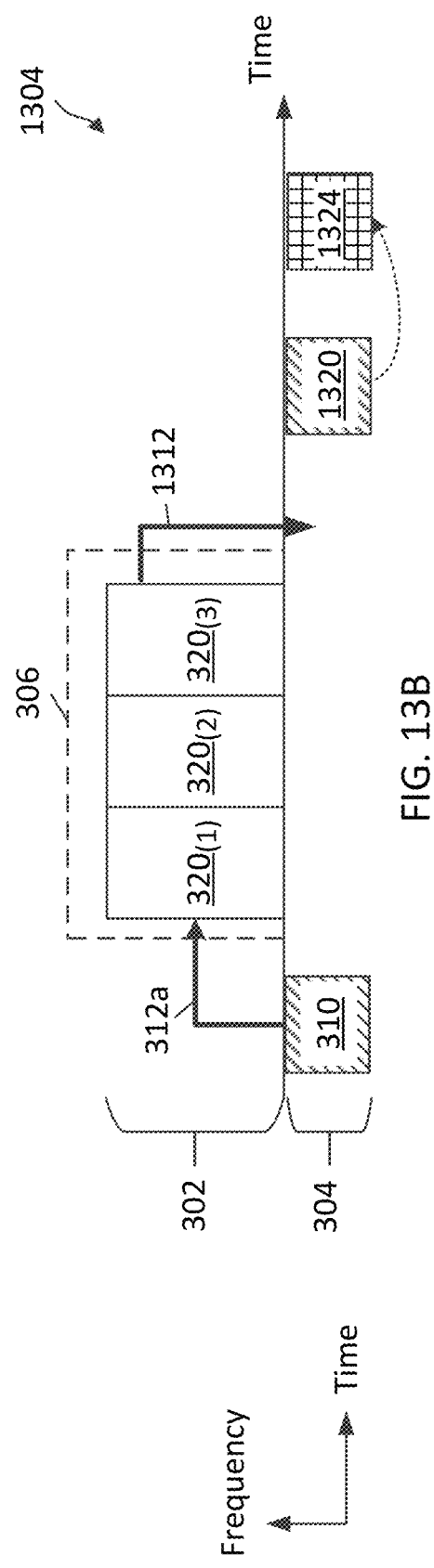
FIG. 13A
FIG. 13B

QUICK BANDWIDTH PART (BWP) SWITCHING MECHANISM AFTER DATA BURST

CROSS REFERENCE TO RELATED APPLICATIONS

The present application claims priority to and the benefit of the Indian Provisional Patent Application No. 201941032558, filed Aug. 12, 2019, which is hereby incorporated by reference in its entirety as if fully set forth below and for all applicable purposes.

TECHNICAL FIELD

This application relates to wireless communication systems, and more particularly to bandwidth part (BWP) switching after data communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. For example, a transmitting node may listen to the channel to determine whether there are active transmissions in the channel. When the channel is idle, the transmitting node may proceed with transmitting in the channel. Otherwise, the transmitting node may refrain from accessing the channel.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication including receiving, by a user equipment (UE) from a base station (BS) in a first bandwidth part (BWP), one or more data bursts and BWP switching information; switching, by the UE, from the first BWP to a second BWP based on the BWP switching information after receiving the one or more data bursts; and communicating, by the UE with the BS, a communication in the second BWP after the switching.

In an additional aspect of the disclosure, a method of wireless communication including communicating, by a user equipment (UE) with a base station (BS) in a first bandwidth part (BWP), one or more data bursts; switching, by the UE, autonomously from the first BWP to a second BWP different from the first BWP after communicating the one or more data bursts; and communicating, by the UE with the BS, a communication in the second BWP after the switching.

In an additional aspect of the disclosure, a use equipment (UE) including a transceiver configured to receive, from a base station (BS) in a first bandwidth part (BWP), one or more data bursts and BWP switching information; switch the transceiver from communication in the first BWP to communication in a second BWP based on the BWP switching information after the one or more data bursts are received; and communicate, with the BS, a communication signal in the second BWP after the switching.

In an additional aspect of the disclosure, a user equipment (UE) including a transceiver configured to communicate, with a base station (BS) in a first bandwidth part (BWP), one or more data bursts; switch the transceiver from communication in the first BWP to a second BWP different from the first BWP autonomously after communicating the one or more data bursts; and communicate, with the BS, a communication signal in the second BWP after the switching.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 13A illustrates an acknowledgement/negative-acknowledgement (ACK/NACK) communication scheme with BWP switching according to embodiments of the present disclosure.

FIG. 13B illustrates an ACK/NACK communication scheme with BWP switching according to embodiments of the present disclosure.

DETAILED DESCRIPTION

Figure 1:
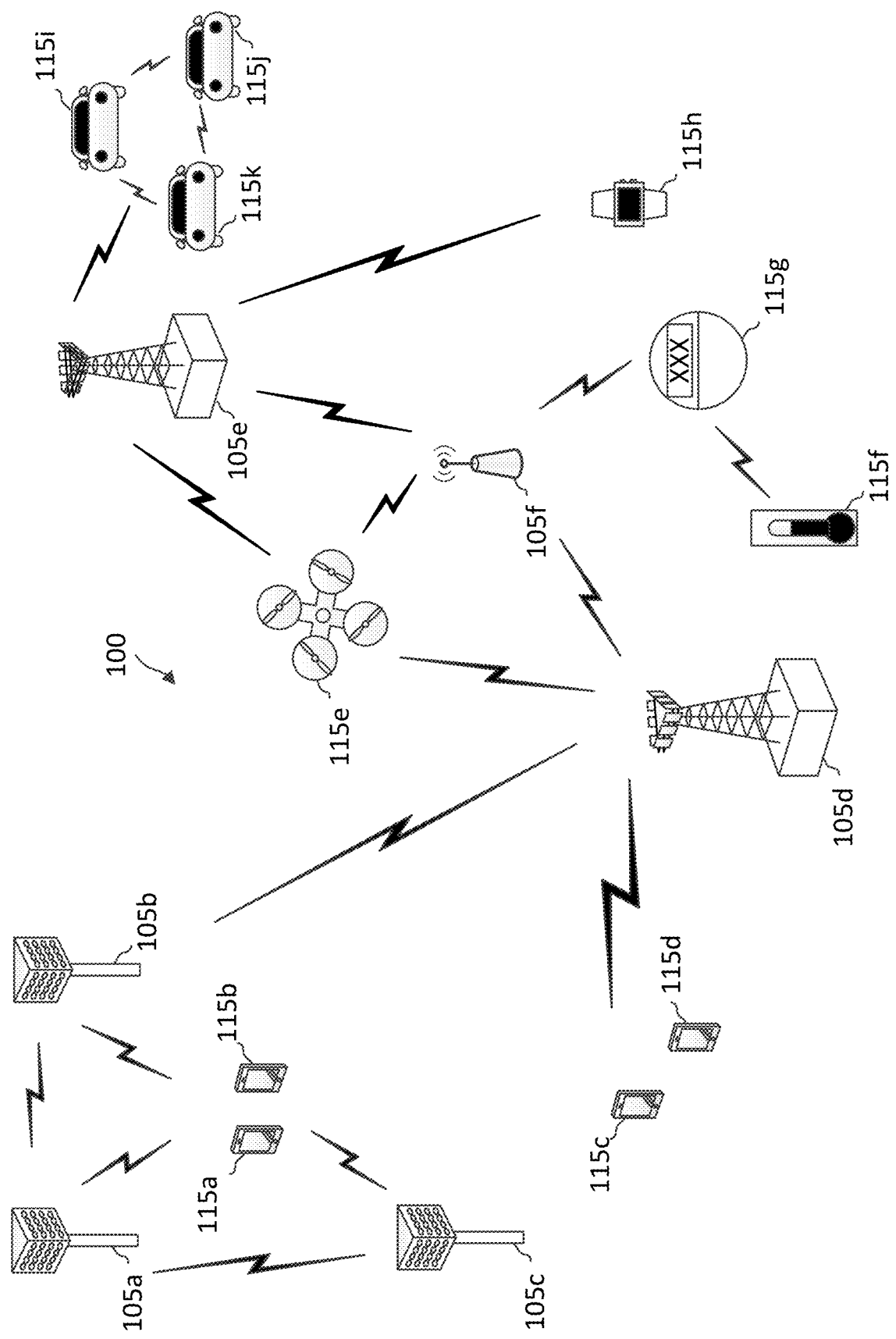
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS may configure a UE with a narrowband BWP and a wideband BWP for communications. The BS may configure the UE to communicate in the narrowband BWP by default for power saving. The BS may trigger the UE to switch to the wideband BWP for DL communication. The UE may transmit one or more acknowledgement/negative-acknowledgements (ACK/NACKs) to provide the BS with a reception status regarding the DL communications. After receiving the ACK/NACKs, the BS may trigger the UE to switch back to the narrowband BWP. When the network operates over a shared frequency band (e.g., in a shared spectrum or an unlicensed spectrum), a listen-before-talk (LBT) may be performed prior to the transmission of the ACK/NACKs and/or the transmission of the BWP switching trigger. LBTs are unpredictable due to contentions from multiple nodes, and thus LBT delays can be long. As such, there may be a long delay from the time when the DL communication ends to the time when the BS triggers the UE to switch back to the narrowband BWP. The delaying of the BWP switch to the narrowband BWP may impact UE power savings.

The present application describes mechanisms for performing BWP switching after data communications. For example, a BS may configure a UE with a first BWP (e.g., a wideband BWP) and a second BWP (e.g., a narrowband BWP) in a shared frequency band (e.g., in a shared spectrum or an unlicensed spectrum). The BS may schedule the UE to receive a plurality of DL data bursts in the first BWP. In an embodiment, the BS may transmit BWP switching information along with the DL data bursts, for example, in a DL scheduling grant or as part of a DL burst (e.g., within the data payload of the DL data burst). The BWP switching information enables the UE to switch to the second BWP after receiving a last data burst of the scheduled DL data bursts. In another embodiment, the BS may configure the UE to autonomously initiate a switch to the second BWP after receiving the last data burst.

In an embodiment, the BS may communicate the DL data bursts with the UE using hybrid automatic repeat request (HARQ) techniques. The BWP switching information can indicate a number of outstanding DL data bursts scheduled for the UE, a number of outstanding ACK/NACKs the BS expects from the UE, a BWP switching delay, and/or an indication of a BWP where the UE may switch to. The UE may count or track the number of DL data bursts scheduled for the UE and determine whether the UE had received all scheduled data bursts. In an example, the BWP switching information in the last data burst may include a last data burst indicator. In an example, the BWP switching information in the last data burst may include a BWP switching command.

In an embodiment, the BS may monitor for ACK/NACKs from the UE in the first BWP. In some instances, the BS may fail to receive an ACK/NACK for one or more of the DL data bursts from the UE, for example, due to an UL error, a DL error, or the UE switches to the second BWP before transmitting the ACK/NACK. Upon detecting a missed ACK/NACK, the BS may retransmit a DL data burst corresponding to the missed ACK/NACK in the first BWP. Additionally or alternatively, the BS may transmit a request in the second BWP to request the UE to transmit the ACK/NACK in the first BWP. In another example, the BS may transmit a request in the second BWP to request the UE to transmit the ACK/NACK in the second BWP.

In an embodiment, the BS may configure the UE to transmit one or more UL data bursts in the first BWP and may configure the UE to autonomously initiate a switch to the second BWP after completing the UL transmission. The BS may further configure the UE to delay the BWP switch for a certain period to allow the BS to process the UL data bursts and/or schedule any retransmissions.

Aspects of the present disclosure can provide several benefits. For example, the inclusion of BWP switching information in a DL scheduling grant or within a DL data burst and/or the autonomous BWP switch configuration can allow the UE to quickly switch to the second BWP (e.g., the narrowband BWP) after receiving a last scheduled DL data burst and/or after completing transmissions of UL data bursts. The disclosed embodiments can reduce the amount of time that the UE spent in monitoring the first BWP (e.g., the wideband BWP) after completing a DL communication or a UL communication. The disclosed embodiments can also remove the dependency on the LBT delays, which can be significant in a congested channel, from the BWP switching delay. Thus, the disclosed embodiments can provide the UE with extra power savings. While the disclosed embodiments are described in the context of reducing delays in switching from a wideband BWP to a narrowband BWP, the disclosed embodiments may be applied to quickly switch from any BWP to another BWP after a communication.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames.

A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as a message 1 (MSG 1), a message 2 (MSG 2), a message 3 (MSG 3), and a message 4 (MSG 4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. In some embodiments, the BS 105 and the UE 115 may employ hybrid automatic request (HARQ) techniques for communications to improve reliability as described in greater detail herein below.

In an embodiment, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the component carrier to a UE 115 for UL and DL communications. For example, the BWP pair may include one BWP for UL communications and one BWP for DL communications.

In an embodiment, the network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may employ a LBT procedure to acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP). The BS 105 or the UE 115 may perform an LBT in the frequency band prior to transmitting in the frequency band. The LBT can be based on energy detection or signal detection. For energy detection, the BS 105 or the UE 115 may determine that the channel is busy or occupied when a signal energy measured from the channel is greater than a certain signal energy threshold. For signal detection, the BS 105 or the UE 115 may determine that the channel is busy or occupied when a certain reservation signal (e.g., a preamble signal sequence) is detected in the channel.

Further, the BS 105 may configure the UE 115 with multiple BWPs in the shared frequency band for communications. The BS 105 may configure the UE 115 with a default BWP having a narrow bandwidth for power saving. The BS 105 may trigger the UE 115 to switch to a wideband BWP for data transmission. After the data communication, the UE 115 may switch back to the narrowband BWP. Mechanisms for allowing the UE 115 to quickly switch back to the narrowband BWP after data communication in the wideband BWP are described in greater detail herein.

Figure 2:
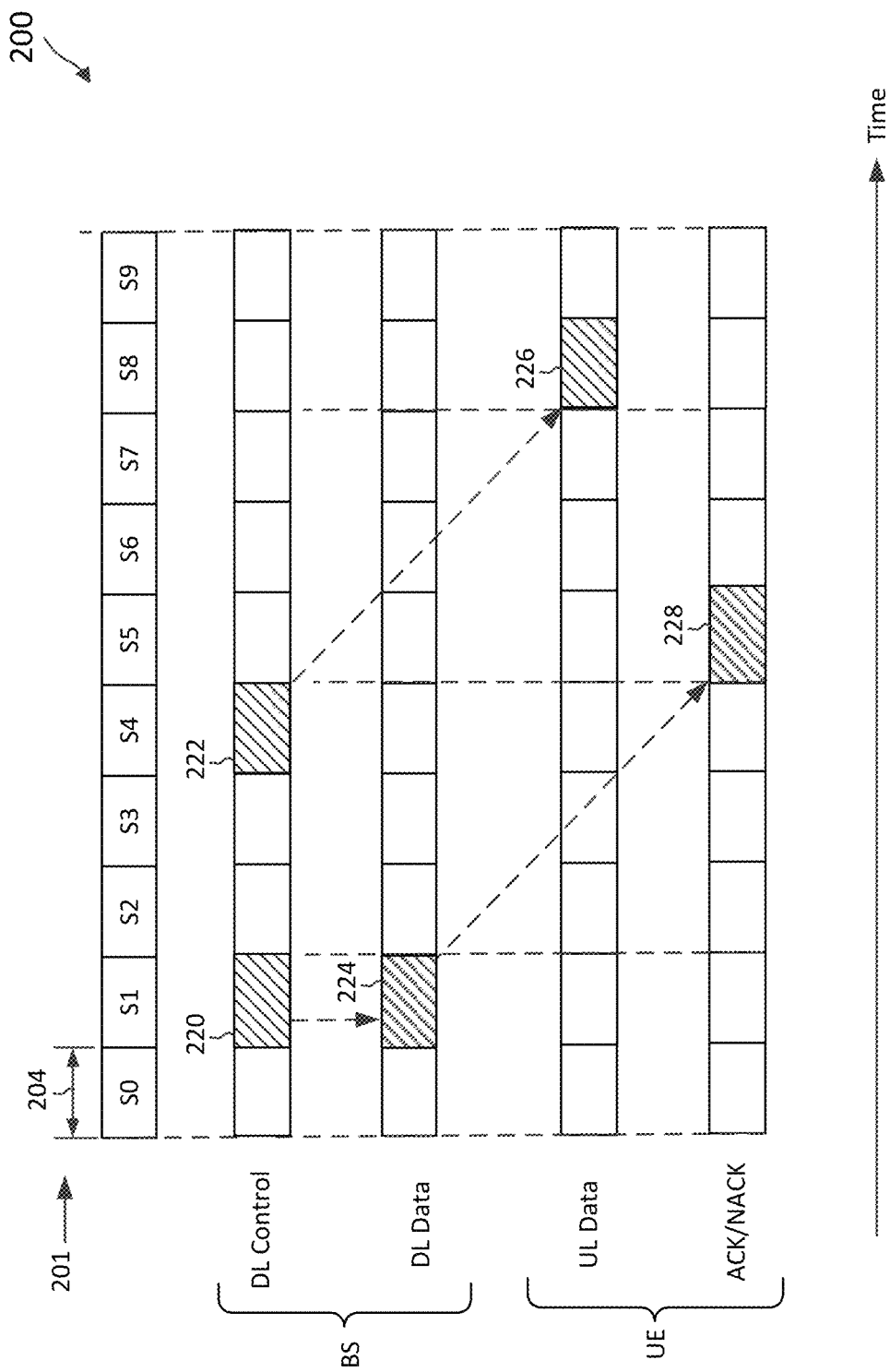
FIG. 2 illustrates a scheduling/transmission configuration according to some embodiments of the present disclosure.

FIG. 2 illustrates a scheduling/transmission configuration 200 implementing HARQ according to some embodiments of the present disclosure. The transmission/scheduling configuration 200 may correspond to a scheduling/transmission configuration in a HARQ communication between a BS 105 and a UE 115 of the network 100. In FIG. 2, the x-axis represents time in some constant units. FIG. 2 shows a frame structure 201 including a plurality of slots 204 in time. The slots 204 are indexed from S0 to S9. For example, a BS may communicate with a UE in units of slots 204. The slots 204 may also be referred to as transmission time intervals (TTIs). Each slot 204 or TTI carry a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, 5G, or NR, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The pattern-filled boxes represent transmissions of DL control information (DCI), DL data, UL data, an ACK, and/or an NACK in corresponding slots 204. While an entire slot 204 is pattern-filled, a transmission may occur only in a corresponding portion of the slot 204. FIG. 2 illustrates a DL HARQ communication and a UL HARQ communication between the BS and the UE.

For DL HARQ, the BS transmits DCI 220 in the slot 204 indexed S1 (e.g., in a DL control portion of the slot 204). The DCI 220 may indicate a DL grant for the UE. The BS transmits a DL data signal 224 to the UE in the same slot 204 indexed S1 (e.g., in a DL data portion of the slot 204) based on the DL grant assignment. After receiving the DL data signal 224, the UE may report a reception status of the DL data signal 224 to the BS by transmitting an acknowledgement (ACK)/negative-acknowledgement (NACK) signal 228. The ACK/NACK signal 228 refers to a feedback signal carrying an ACK or an NACK. The feedback may be an acknowledgement (ACK) indicating that reception of the DL data by the UE is successful or may be a negative-acknowledgement (NACK) indicating that reception of the DL data by the UE is unsuccessful (e.g., including an error or failing an error correction). The ACK/NACK signal 228 may be associated with a certain HARQ process. If the ACK/NACK signal 228 includes a NACK, the BS may retransmit the DL data in the DL data signal 224. While not shown, the BS may indicate an ACK/NACK resource (e.g., a UCI resource) in the slot 204 indexed S5 for the UE to transmit the ACK/NACK signal 228. In some examples, the BS may indicate the ACK/NACK resource in the DCI 222.

In a HARQ process, a transmitting node may transmit various coded versions of information data to a receiving node. For example, the transmitting node may transmit a first coded version of information data to the receiving node. Upon receiving an NACK signal from the receiving node, the transmitting node may transmit a second coded version of the information data to the receiving node. The receiving node may combine the received first coded version and the received second coded version for error correction when both the received first coded version and the received second coded version are erroneous.

The UL HARQ may be substantially similar to the DL HARQ, but data transmission is in an UL direction and ACK/NACK feedback is in a DL direction. For example, the BS transmits DCI 222 in the slot 204 indexed S4. The DCI 222 may indicate a UL grant for the UE. The UE transmits a UL data signal 226 to the BS in the slot 204 indexed S8 (e.g., in a UL data portion of the slot 204) based on UL grant assignment. After receiving the UL data signal 226, the BS determine whether UL data in the UL data signal 226 is received successfully. Instead of transmitting an ACK/NACK to the UE, the BS may reschedule the UE for a retransmission upon detecting a failure. In some examples, the BS may communicate the HARQ communications with the UE in a shared frequency band (e.g., a shared spectrum or an unlicensed spectrum). As described above, LBT is required prior to transmitting in a shared frequency band. LBT results are unpredictable due to contentions. Thus, the UE may or may not be able to transmit an ACK/NACK as scheduled due to LBT. The uncertainty in LBT may impact BWP switching delay with HARQ communications shown in FIG. 3.

Figure 3:
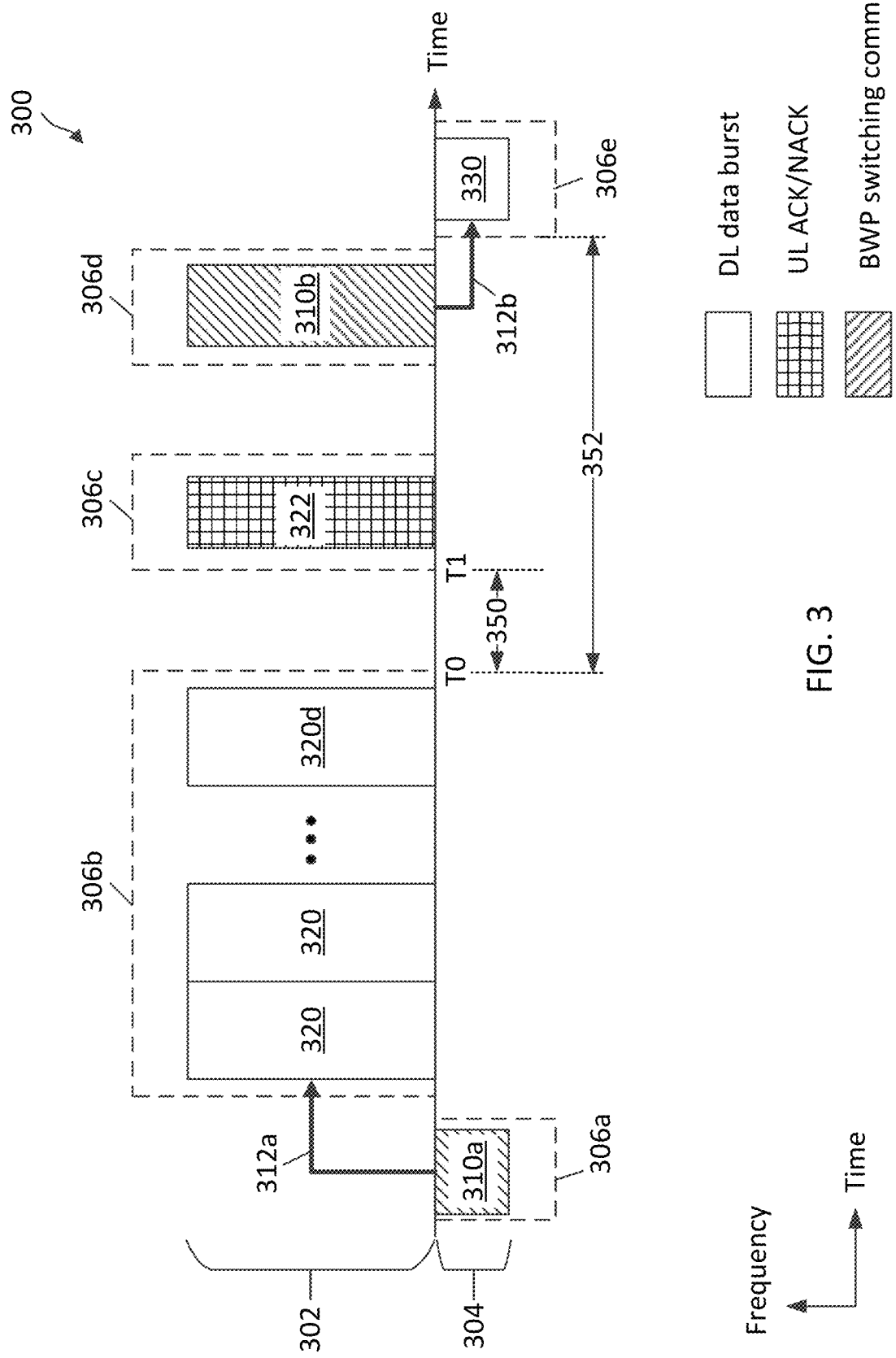
FIG. 3 illustrates a bandwidth part (BWP) switching scenario according to some embodiments of the present disclosure.

FIG. 3 illustrates a BWP switching scenario 300 according to some embodiments of the present disclosure. The scenario 300 may correspond to a BWP switching scenario in a communication between a BS 105 and a UE 115 of the network 100. In FIG. 3, the axis represents time in some arbitrary units, and the y-axis represents frequency in some arbitrary units. In the scenario 300, a BS configures a UE with a wideband BWP 302 and a narrowband BWP 304. The BS may configure the wideband BWP 302 or the narrowband BWP 304 as an active BWP at any given time. The BS may communicate with the UE in the active BWP. The wideband BWP 302 and the narrowband BWP 304 may be located at any suitable frequencies. The wideband BWP 302 and the narrowband BWP 304 may be in a shared frequency band (e.g., a shared frequency band or an unlicensed band). The wideband BWP 302 and the narrowband BWP 304 adjacent channels in a frequency band. Alternatively, the wideband BWP 302 and the narrowband BWP 304 may be spaced apart from each other (e.g., separated by another channel). In some examples, the wideband BWP 302 may have a BW of about 80 MHz or more and the narrowband BWP 304 may have a BW of about 20 MHz or less. In general, the wideband BWP 302 may have a wider bandwidth than the narrowband BWP 304.

In an example, the BS may configure the narrowband BWP 304 as a default BWP for the UE to enable power saving at the UE. For example, the UE may consume less power when monitoring, receiving, and/or transmitting in a narrower band and/or processing signals of a narrower BW. The UE may monitor for communication from the BS in the narrowband BWP 304. The BS may trigger the UE to switch from the narrowband BWP 304 to the wideband BWP 302 to enable data transmission. After data transmission, the BS may trigger the UE to switch back to the default narrowband BWP 304. Alternatively, the BS may configure the UE to switch back to the narrowband BWP 304 based on an inactivity timer. For example, if the UE does not receive any communication from the BS in the wideband BWP 302 for a certain period of time, the UE may switch from the wideband BWP 302 back to the default narrowband BWP 304.

To trigger the switch from the narrowband BWP 304 to the wideband BWP 302, the BS may perform an LBT in the wideband BWP 302 to acquire a COT or TXOP. As an example, the LBT is a pass and the BS acquired a COT 306a in the narrowband BWP 304. The BS transmits a BWP switching command 310a in the narrowband BWP 304 during the COT 306a. In an example, the BS may transmit the BWP switching command 310a in DCI (e.g., via a PDCCH channel). The BWP switching command 310a may indicate a BWP switch instruction to the wideband BWP 302. Upon receiving the BWP switching command 310a, the UE switches from the narrowband BWP 304 to the wideband BWP 302 as shown by the arrow 312a. To perform the switch, the UE may reconfigure various RF frontend components of the UE for communications in the wideband. After switching to the wideband BWP 302, the UE may monitor for a communication (e.g., scheduling grants) from the BS in the wideband BWP 302.

The BS may perform an LBT in the wideband BWP 302 and acquires a COT 306b in the wideband BWP 302. The LBT can be a category 4 (CAT4) LBT. A CAT4 LBT refers to an LBT with a random backoff and a variable contention window. The BS may schedule the UE for DL data transmissions (e.g., PDSCH transmissions) in the COT 306b. As an example, the BS schedules the UE for communicating a plurality of DL data bursts 320 during the COT 306b. The BS may transmit a scheduling grant in a DCI (e.g., the DCI 222) to the UE and may subsequently transmit a DL data burst 320 based on the scheduling grant in a similar manner as shown in FIG. 2 discussed above. In some examples, the BS may transmit a DCI or DL scheduling grant for each DL data burst 320. In some examples, the BS may transmit a DCI or DL scheduling grant to schedule a group of DL data bursts 320 in consecutive time period. The DL data bursts may be associated with one or more HARQ processes. The BS may configure ACK/NACK resources in the COT 306b for the UE to transmit an ACK/NACK for each of the DL data burst 320. For simplicity of illustration, the transmission of the DL scheduling grants for the DL data bursts 320 and the ACK/NACKs for the DL data bursts 320 are not shown in FIG. 3 except for the ACK/NACK for the last data burst 320 (shown as 320d) in the COT 306b.

To transmit an ACK/NACK to the BS, the UE may perform an LBT (e.g., a CAT2 LBT) in the wideband BWP 302. When the LBT is successful, the UE may transmit the ACK/NACK. For example, the UE may perform an LBT during a gap 350 after the COT 306b. The LBT may be a category 2 (CAT2) LBT. A CAT2 LBT refers to an LBT without a random backoff. After a successful LBT, the UE gains a COT 306c in the in the wideband BWP 302. The UE transmits an ACK/NACK 322 for the last DL data burst 320d to the BS during the COT 306c. The UE may transmit an ACK when the last data burst 320d is received and decoded successfully. The UE may transmit a NACK when the UE fails to receive the last data burst 320d successfully. In some examples, the COT 306c may be within the COT 306b acquired by the BS. In some examples, the COT 306c may be outside the BS-acquired COT 306b due to processing timeline at the UE. When the COT 306c is outside a BS-acquired COT, the UE may perform a CAT4 LBT to gain the COT 306c.

If the ACK/NACK 322 indicates an ACK, the BS may configure the UE to switch back to the narrowband BWP 304. The BS may perform an LBT in the wideband BWP 302 to gain a COT 306d. The BS transmits a BWP switching command 310b during the COT 306d to instruct the UE to switch back to the narrowband BWP 304. The BS may transmit the BWP switching command 310b in a DCI.

Upon receiving the BWP switching command 310b, the UE switches from the narrowband BWP 304 to the wideband BWP 302 as shown by the arrow 312b. After switching to the narrowband BWP 304, the UE may monitor for a communication (e.g., scheduling grants) from the BS in the narrowband BWP 304. For example, the BS may perform an LBT in the narrowband BWP 304 to gain a COT 306e. The BS transmits a DL data burst 320 to the UE during the COT 306e.

As can be observed, there is a delay 352 between a time T0 when the transmission of the DL bursts 320 completes and a time T1 when the BWP switch completes at a time T1. The delay 352 may include processing of the ACK/NACK 322 at the UE and LBT delays. Due to multiple LBTs are required to gain the COT 306c and 306d and the uncertainty in LBT, the delay 352 may be long. For example, the UE may fail to acquire the COT 306c for transmitting the ACK/NACK 322 initially and may retry with one or more attempts before gaining the COT 306c. Similarly, the BS may fail to acquire the COT 306d for transmitting the BWP switching command 330 initially and may retry with one or more attempts before gaining the COT 306d. Thus, the delay 352 can be as long as a few milliseconds (ms) to tens of ms. During the delay 352, the UE may continue to monitor the wideband BWP 302, for example, during PDCCH monitoring occasions configured by the BS. Thus, the long delay 352 may impact power savings at the UE. The impact may be significant when a BWP switch is performed after every DL data burst transmission and/or every COT for UE power savings. While the UE may switch back to the narrowband BWP 304 after a certain inactive period (e.g., no transmission received from the BS), an inactivity timer may have a substantially long period to account for LBT delays, and thus may not be desirable.

Accordingly, the present disclosure provides techniques for reducing a BWP switching delay (e.g., the delay 352) to improve UE power savings. For example, a BS may configure a UE with BWP switching information along with DL data transmissions instead of waiting until after receiving and processing the ACK/NACK 322 and acquiring another COT for transmitting the BWP switching command 310*b*. Alternatively, the BS can allow the UE to autonomously perform a BWP switch after a data communication.

Figure 4:
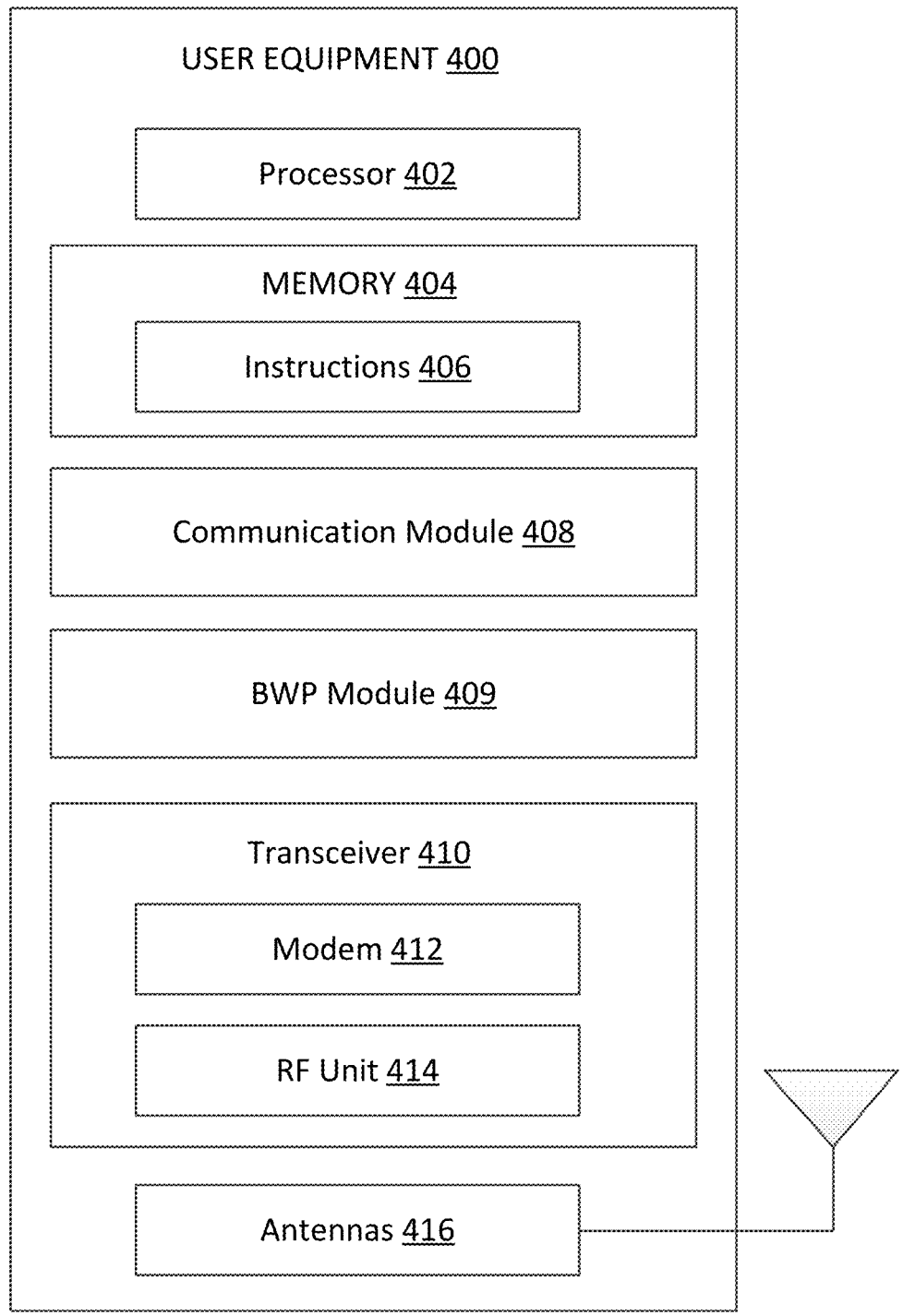
FIG. 4 is a block diagram of a user equipment (UE) according to some embodiments of the present disclosure.

FIG. 4 is a block diagram of an exemplary UE 400 according to embodiments of the present disclosure. The UE 400 may be a UE 115 discussed above in FIG. 1. As shown, the UE 400 may include a processor 402, a memory 404, a communication module 408, a BWP switching module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115 in connection with embodiments of the present disclosure, for example, aspects of FIGS. 2-3 and 6-16. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

Each of the communication module 408 and the BWP switching module 409 may be implemented via hardware, software, or combinations thereof. For example, each of the communication module 408 and the BWP switching module 409 may be implemented as a processor, circuit, and/or instructions 406 stored in the memory 404 and executed by the processor 402. In some examples, the communication module 408 and the BWP switching module 409 can be integrated within the modem subsystem 412. For example, the communication module 408 and the BWP switching module 409 can be implemented by a combination of software components (e.g., executed by a DSP or a general processor) and hardware components (e.g., logic gates and circuitry) within the modem subsystem 412. In some examples, a UE may include one or both of the communication module 408 and the BWP switching module 409. In other examples, a UE may include all of the communication module 408 and the BWP switching module 409.

The communication module 408 and the BWP switching module 409 may be used for various aspects of the present disclosure, for example, aspects of FIGS. 2-3 and 6-16. The communication module 408 is configured to receive one or more DL scheduling grants from a BS (e.g., the BSs 105) indicating DL resources (e.g., time-frequency resources in a wideband BWP 302), transmit one or more DL data bursts in the DL resources, transmit an ACK/NACK for each received data burst, receive one or more UL scheduling grants from the BS indicating UL resources, transmit one or more UL data bursts in the UL resources, receive BWP switching information and/or configuration, and/or provide the BWP switching information and/or configuration to the BWP switching module 409 for performing BWP switching. The one or more DL data bursts may be scheduled for the UE 400 in a certain duration within a BS-acquire COT. The one or more UL data bursts may be scheduled for the UE 400 in a certain duration within a BS-acquire COT.

The BWP switching module 409 is configured to receive the one or more DL data bursts and the BWP switching information from the BS via the communication module 408 and perform a BWP switch (e.g., to the default narrowband BWP 304) after receiving a last data burst of the one or more DL data burst based on the BWP switching information. The BWP switching information can be included in one or more of the DL scheduling grants or encoded within the last data burst. The BWP switching information can include a number of outstanding DL data bursts scheduled for the UE 400, or a number of outstanding ACK/NACKs that BS expects from the UE 400, a BWP switching delay. The BWP information in a scheduling grant for the last data burst or within the last data burst may include a last data burst indicator and/or a BWP switching command (e.g., indicating a BWP that the UE 400 may switch to).

In an embodiment, the BWP switching module 409 is configured to perform a BWP switch (e.g., to the default narrowband BWP 304) autonomously after receiving all the DL data bursts. In an example, the BWP switching module 409 is configured to perform a BWP switch (e.g., to the default narrowband BWP 304) autonomously after transmitting all the UL data bursts. The autonomous BWP switch is initiated by the UE 400 without a request or trigger from the BW. In an example, the BWP switch switching module 409 may wait for a certain delay period before performing an autonomous BWP switch. In an example, the BWP switching module 409 is configured to receive a configuration indicating the delay period for performing the BWP switch.

In an embodiment, the BWP switching module 409 is configured to receive an ACK/NACK feedback request in the narrowband BWP requesting the UE 400 for an ACK/NACK to be transmitted in the wideband BWP, perform a BWP switch from the wideband BWP to the narrowband BWP, and transmit an ACK/NACK in the wideband BWP based on the request. In an embodiment, the BWP switching module 409 is configured to receive an ACK/NACK feedback request in the narrowband BWP requesting the UE 400 for an ACK/NACK to be transmitted in the narrowband BWP, receive an ACK/NACK codebook parameter for transmitting an ACK/NACK in the narrowband BWP, and transmit an ACK/NACK in the narrowband BWP based on the request and the codebook parameter. In an embodiment, the BWP switching module 409 is configured to switch to the narrowband BWP after receiving the one or more DL data burst in the wideband BWP and transmit an ACK/NACK for the one or more of the received DL data bursts in the narrowband BWP using a narrowband ACK/NACK codebook. Mechanisms for BWP switching are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the communication module 408, and/or the BWP switching module 409 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., UL data bursts, ACK/NACKs for DL data bursts) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., DL/UL scheduling grants, DL data bursts, BWP switching information, RRC messages, BWP switching commands, ACK/NACK requests) to the BWP switching module 409 for processing. The antennas 416 may include multiple antennas of similar or different designs in order to sustain multiple transmission links. The RF unit 414 may configure the antennas 416. In an embodiment, the RF unit 414 and/or the transceiver 410 may be configured to operate over different BWPs (e.g., a wideband BWP and a narrowband BWP) and may be configured to switch back and forth dynamically. The switching may include reconfiguring various components (e.g., amplifiers, filters, clocks) in RF unit 414 and/or in the transceiver 410.

In an embodiment, the UE 400 can include multiple transceivers 410 implementing different RATs (e.g., NR and LTE). In an embodiment, the UE 400 can include a single transceiver 410 implementing multiple RATs (e.g., NR and LTE). In an embodiment, the transceiver 410 can include various components, where different combinations of components can implement different RATs.

Figure 5:
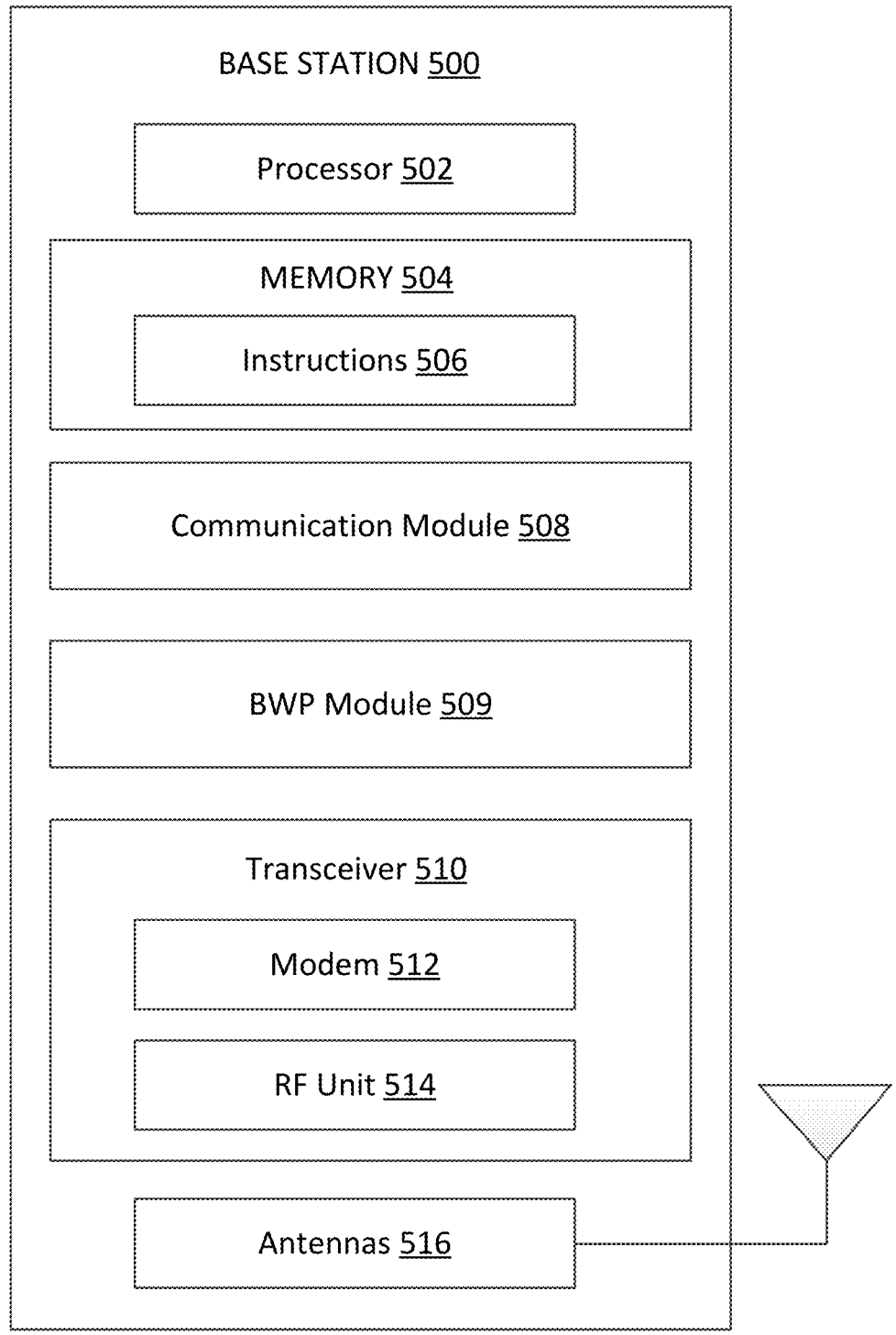
FIG. 5 is a block diagram of an exemplary base station (BS) according to embodiments of the present disclosure.

FIG. 5 is a block diagram of an exemplary BS 500 according to embodiments of the present disclosure. The BS 500 may be a BS 105 as discussed above in FIG. 1. As shown, the BS 500 may include a processor 502, a memory 504, a communication module 508, a BWP switching module 509, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 504 may include a non-transitory computer-readable medium. The memory 504 may store instructions 506. The instructions 506 may include instructions that, when executed by the processor 502, cause the processor 502 to perform operations described herein, for example, aspects of FIGS. 2-3, 6-14, and 17-18. Instructions 506 may also be referred to as code, which may be interpreted broadly to include any type of computer-readable statement(s) as discussed above with respect to FIG. 4.

Each of the communication module 508 and the BWP switching module 509 may be implemented via hardware, software, or combinations thereof. For example, each of the communication module 508 and the BWP switching module 509 may be implemented as a processor, circuit, and/or instructions 506 stored in the memory 504 and executed by the processor 502. In some examples, the communication module 508 and the BWP switching module 509 can be integrated within the modem subsystem 512. For example, the communication module 508 and the BWP switching module 509 can be implemented by a combination of software components (e.g., executed by a DSP or a general processor) and hardware components (e.g., logic gates and circuitry) within the modem subsystem 512. In some examples, a UE may include one or both of the communication module 508 and the BWP switching module 509. In other examples, a UE may include all of the communication module 508 and the BWP switching module 509.

The communication module 508 and the BWP switching module 509 may be used for various aspects of the present disclosure, for example, aspects of FIGS. 2-3, 6-14, and 17-18. The communication module 508 is configured to transmit one or more DL scheduling grants to a UE (e.g., the UEs 115 and/or 400) indicating DL resources (e.g., time-frequency resources in a wideband BWP 302), receive one or more DL data bursts in the DL resources, receive an ACK/NACK for one or more of the transmitted data burst, transmit one or more UL scheduling grants to the UE indicating UL resources, receive one or more UL data bursts in the UL resources, transmit BWP switching information and/or configuration for the UE to perform BWP switch (e.g., to a default narrow band BWP 304), and coordinate with the BWP switching module 509 for communicating with the UE by switching between the wideband BWP or the narrowband BWP. The one or more DL data bursts may be scheduled for the UE in a certain duration within a BS-acquire COT. The one or more UL data bursts may be scheduled for the UE in a certain duration within a BS-acquire COT.

The BWP switching module 509 is configured to generate and transmit the BWP switching information to the UE via the communication module 508. The BWP switching information can be included in one or more of the DL scheduling grants or encoded within the last data burst. The BWP switching information can include a number of outstanding DL data bursts scheduled for the UE0, or a number of outstanding ACK/NACKs that the BS 500 expects from the UE, a BWP switching delay. The BWP information in a scheduling grant for the last data burst or within the last data burst may include a last data burst indicator and/or a BWP switching command (e.g., indicating a BWP that the UE may switch to).

In an embodiment, the BWP switching module 509 is configured to configure the UE to perform a BWP switch (e.g., to the default narrowband BWP 304) autonomously after receiving all the DL data bursts. In an embodiment, the BWP switching module 509 is configured to configure the UE to perform a BWP switch (e.g., to the default narrowband BWP 304) autonomously after transmitting all the UL data bursts. In an example, the BWP switching module 509 is configured to configure the UE to delay a BWP switch after receiving a last data burst of the one or more DL data bursts and/or after transmitting the one or more UL data bursts.

In an embodiment, the BWP switching module 509 is configured to determine whether all ACK/NACK are received for the transmitted DL data bursts, schedules a retransmission for a DL data burst without an ACK/NACK received from the UE, monitor for communication from the UE in the narrowband BWP and the wideband BWP to determine whether the UE is active (e.g., performing PDCCH monitoring) in the narrowband BWP or the wideband BWP. In an example, the BWP switching module 509 is configured to transmit an ACK/NACK feedback request in the narrowband BWP requesting the UE for an ACK/NACK to be transmitted in the wideband BWP and monitor for an ACK/NACK from the UE in the wideband BWP. In an example, the BWP switching module 509 is configured to transmit an ACK/NACK feedback request in the narrowband BWP requesting the UE for an ACK/NACK to be transmitted in the narrowband BWP and monitor for an ACK/NACK from the UE in the narrowband BWP. In an example, the BWP switching module 509 is configured to transmit an ACK/NACK codebook parameter for the UE to transmit an ACK/NACK in the narrowband BWP. Mechanisms for BWP switching are described in greater detail herein.

As shown, the transceiver 510 may include the modem subsystem 512 and the RF unit 514. The transceiver 510 can be configured to communicate bi-directionally with other devices, such as the UEs 115 and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., (e.g., DL/UL scheduling grants, DL data bursts, BWP switching information, RRC messages, BWP switching commands, ACK/NACK requests)) from the modem subsystem 512 (on outbound transmissions) or of transmissions originating from another source such as a UE 115 or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115 or 400 according to embodiments of the present disclosure. The antennas 516 may further receive data messages transmitted from other devices and provide the received data messages for processing and/or demodulation at the transceiver 510. The transceiver 510 may provide the demodulated and decoded data (e.g., UL data bursts, ACK/NACKs for DL data burst) to the BWP switching module 509 for processing. The antennas 516 may include multiple antennas of similar or different designs in order to sustain multiple transmission links. In an embodiment, the RF unit 514 and/or the transceiver 510 may be configured to operate over different BWPs (e.g., a wideband BWP and a narrowband BWP) at the same time and/or dynamically switch among the different BWPs.

In an embodiment, the BS 500 can include multiple transceivers 510 implementing different RATs (e.g., NR and LTE). In an embodiment, the BS 500 can include a single transceiver 510 implementing multiple RATs (e.g., NR and LTE). In an embodiment, the transceiver 510 can include various components, where different combinations of components can implement different RATs.

Figure 6:
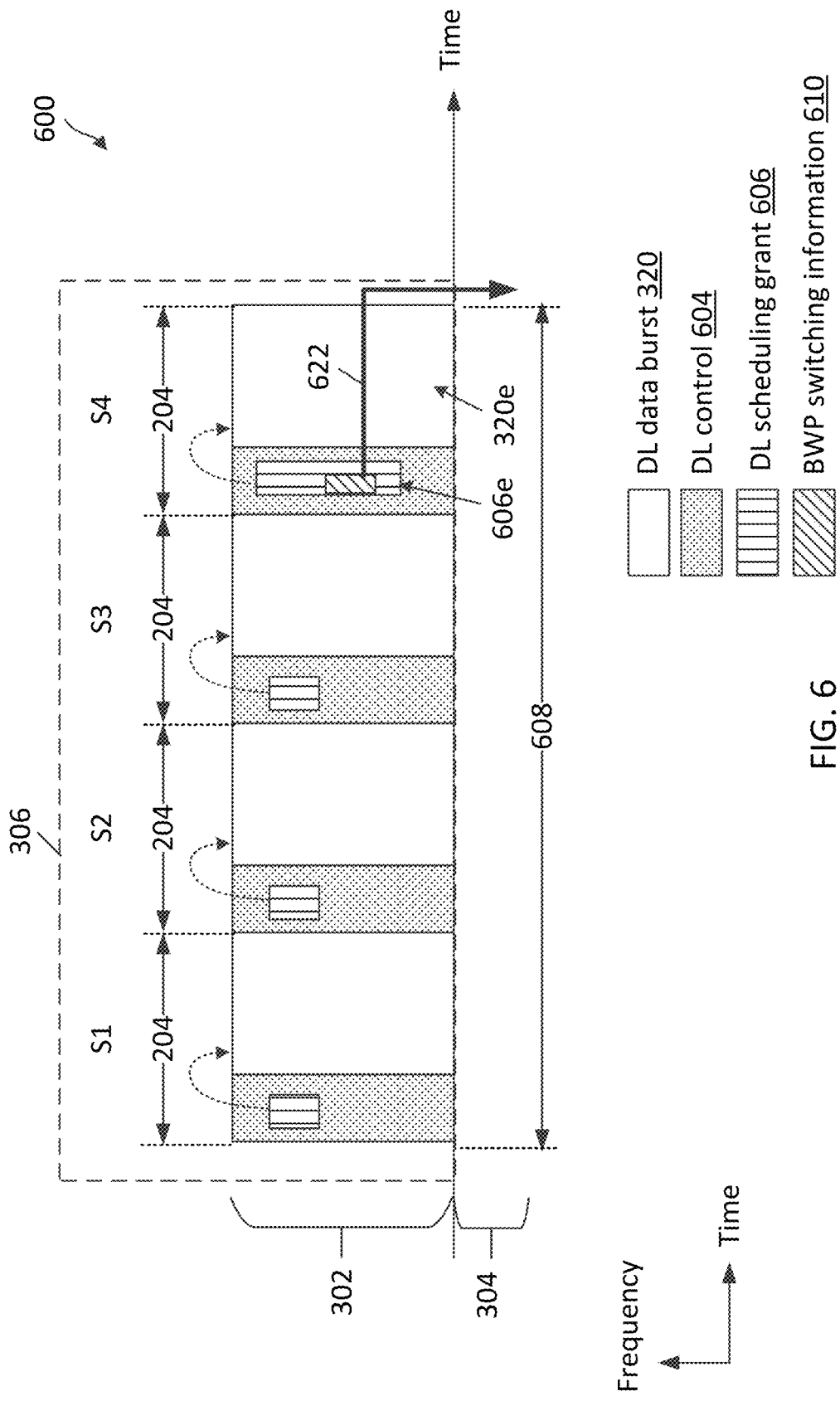
FIG. 6 illustrates a BWP switching scheme according to some embodiments of the present disclosure.
Figure 7:
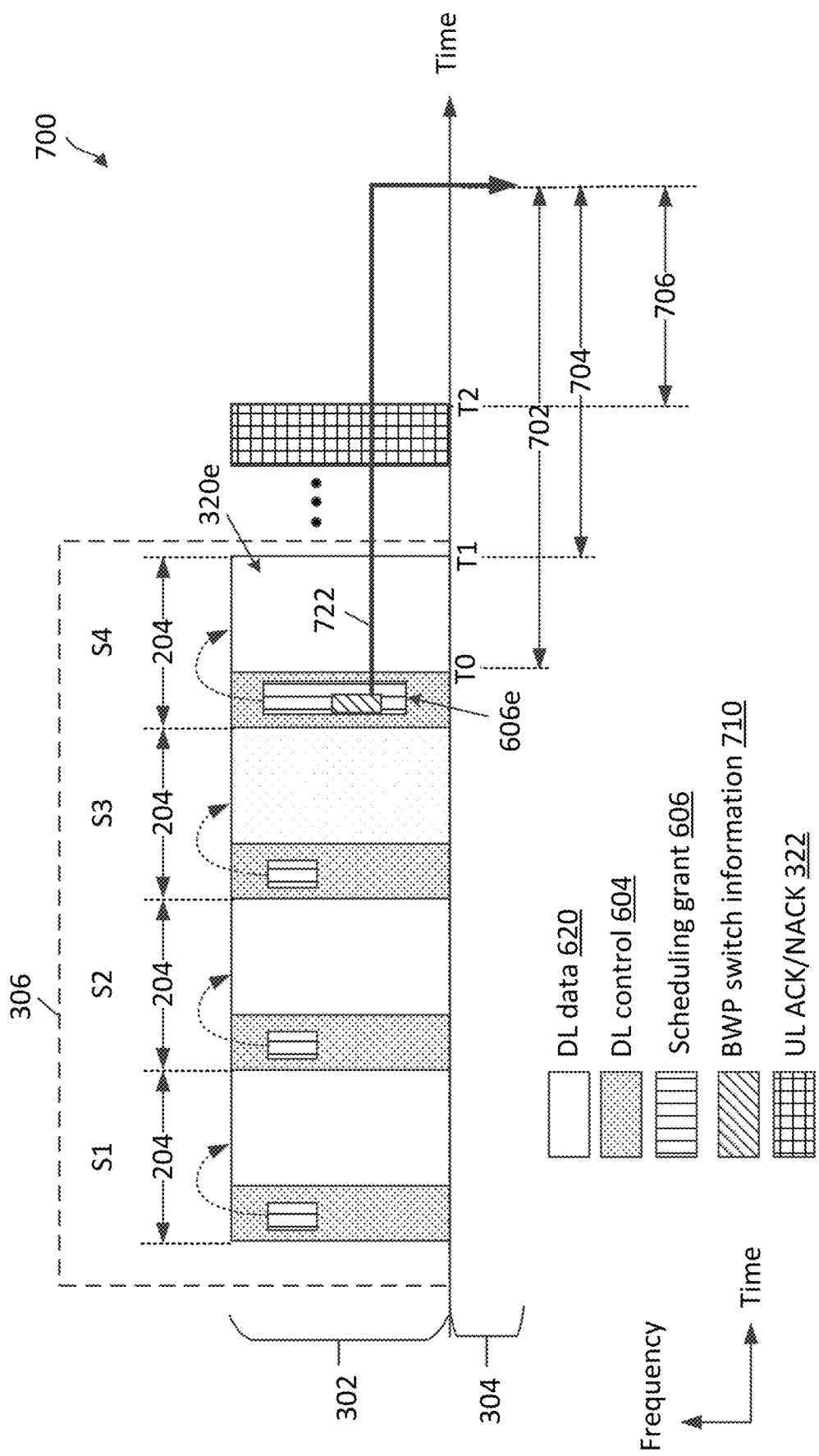
FIG. 7 illustrates a BWP switching scheme according to some embodiments of the present disclosure.
Figure 8:
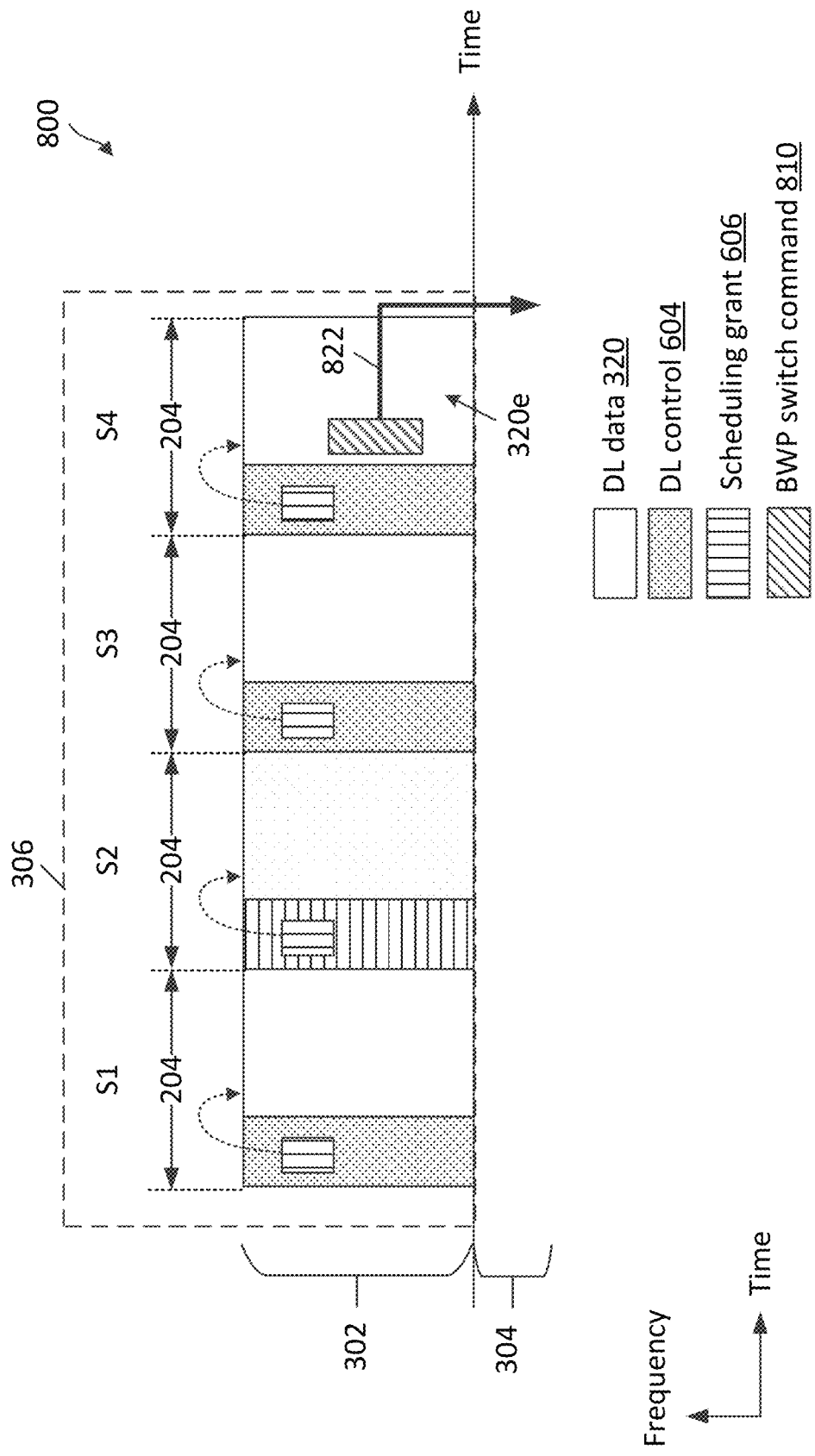
FIG. 8 illustrates a BWP switching scheme according to some embodiments of the present disclosure.

FIGS. 6-8 illustrate various mechanisms for a BS (e.g., the BSs 105 and/or the BS 500) to indicate BWP switching information to a UE along with DL data burst transmissions (e.g., the DL data bursts 320). In FIGS. 6-8, the schemes 600, 700, and/or 800 may be employed by a BS such as the BSs 105 and/or 500 and a UE such as the UEs 115 and/or 400 in a network such as the network 100 operating over a shared frequency band or an unlicensed frequency band. In particular, the BS may schedule a UE for DL data transmissions and trigger the UE to perform a BWP switch after receiving the DL data transmissions as shown in the schemes 600, 700, and/or 800. Additionally, in FIGS. 6-8, the x-axes represent time in some arbitrary units and the y-axes represent frequency in some arbitrary units. Further, the schemes 600-800 are described using the transmission/structure shown in FIG. 2 and the BWP configuration shown in FIG. 3, and may use the same reference numerals as in FIGS. 2 and 3 for simplicity's sake.

FIG. 6 illustrates a BWP switching scheme 600 according to some embodiments of the present disclosure. The scheme 600 may use substantially similar mechanisms for configuring a UE with multiple BWPs for communication, but provides faster BWP switching mechanisms for the UE to switch back to the narrowband BWP 304 after a DL communications in the wideband BWP 302. In the scheme 600, a BS (e.g., the BSs 105 and/or 500) schedules a UE (e.g., the UEs 115 and/or 400) for DL communications in a plurality of slots 204 within a BS-acquired COT 306. As shown, the BS transmits a DL scheduling grant 606 in a DL control portion 604 (e.g., a PDCCH) of each slot 204 (e.g., indexed S1 to S4). The DL scheduling grant 606 may be transmitted in a DCI (e.g., the DCI 222). Each DL scheduling grant 606 may schedule the UE for transmitting a DL data burst 320 to the UE in a corresponding slot 204. The BS may transmit BWP switching information along with the DL communications in one or more of the slots 204 indexed S1 to S4.

In an example, the BS includes BWP switching information 610 in the scheduling grant 606e for the last data burst 320e in the slot 204 indexed S4. As can be seen in FIG. 6, the data bursts 320e is a last data burst 320 in a series of DL data bursts 320 scheduled for the UE. The BWP switching information 610 may include a last data burst indicator indicating that the data burst 320e is a last data burst scheduled for the UE in the wideband BWP 302 (e.g., for a current COT or for at least a certain period 608 within the COT). In other words, the last data burst indicator signals to the UE that there is no more data transmission (e.g., at least in the DL direction) scheduled for the UE in the wideband BWP 302. Upon receiving the last data burst indicator, the UE performs a BWP switch 622 after receiving the last data burst 320e. The UE switches from wideband BWP 302 to the narrowband BWP 304. Alternatively or additionally, the BWP switching information 610 may include a BWP switching command. The BWP switching command may instruct the UE to perform the BWP switch 622. In an example, the BWP switching command may indicate to the UE a BWP (e.g., the BWP 304) where the UE may switch to after receiving the last data burst 320e.

In an example, the BS may include BWP switching information in one or more of the scheduling grants 606. The BWP switching information may signal to the UE a number of outstanding DL data bursts 320 scheduled for the UE. For example, the scheduling grant 606 in the slot 204 indexed S1 may include a dynamic downlink assignment index (DAI) (e.g., DAI=3) indicating that there are three outstanding DL data bursts 320 for the UE. The scheduling grant 606 in the slot 204 indexed S2 may include a DAI (e.g., DAI=2) indicating that there are two outstanding DL data bursts 320 for the UE. The scheduling grant 606 in the slot 204 indexed S3 may include a DAI (e.g., DAI=1) indicating that there is one outstanding DL data burst 320 for the UE. The scheduling grant 606 in the slot 204 indexed S4 or the BWP switching information 610 may include a DAI (e.g., DAI=0) indicating that there is no more outstanding DL data burst 320 for the UE. The UE may count the number of DL scheduling grants 606 received or the number of DL data bursts 320 received. The UE may set the counter to 3 after receiving and decoding the scheduling grant 606 in the slot 204 indexed S1 and subsequently decrement the counter by 1 after receiving a DL scheduling grant 606. If the UE miss-detects the scheduling grant 606 in the slot 204 indexed S2, the UE may detect the miss after receiving the scheduling grant 606 in the slot 204 indexed S3 since there will be a mismatch between the UE counter and the DAI. For example, the UE may have a counter value 2 while the DL scheduling grant 606 may have a DAI of 1.

FIG. 7 illustrates a BWP switching scheme 700 according to some embodiments of the present disclosure. The scheme 700 may use substantially similar to the scheme 600, and may use the same reference numerals as in FIG. 6 for simplicity's sake. However, the scheme 700 may further configure a UE to delay a BWP switch for a certain time period after receiving a last data burst of a series of scheduled data bursts. As shown, the BS includes BWP switching information 710 in the scheduling grant 606e for the last data burst 320e in the slot 204 indexed S4. The BWP switching information 710 indicates a delay after which the UE may perform a BWP switch 722. The delay may be configure based on an ACK/NACK transmission delay (e.g., an average ACK/NACK delay), ACK/NACK processing delay, and/or time for the BS to schedule a HARQ retransmission. The delay may be configured with respect to various points of time. The delay may be in units of symbols, slots (e.g., the slot 204), or any suitable time unit (e.g., in microseconds). In an example, the delay may be with respect to a PDCCH or DL control transmission end time T0, where the delay is shown as 702. In an example, the delay may be with respect to a PDSCH or DL data transmission end time T1, where the delay is shown as 704. In an example, the delay may be with respect to an ACK/NACK transmission end time T2, where the delay is shown as 706. For example, the UE may transmit an ACK/NACK 322 for the last data burst 320e before switching to the narrowband BWP 304.

In an example, the BS may configure the UE with a BWP switching delay (e.g., the delays 702, 704, or 706) via a RRC configuration message. In some examples, the BS may include BWP switching delay information in one more of the scheduling grants 606. The BWP switching information may signal to the UE a number of slots after which the UE may perform the BWP switch 722. For example, the scheduling grant 606 in the slot 204 indexed S1 may indicate a delay of N slots, where N is a positive integer. The scheduling grant 606 in the slot 204 indexed S2 may indicate a delay of N−1 slots. The scheduling grant 606 in the slot 204 indexed S3 may indicate a delay of N−2 slots. The scheduling grant 606 in the slot 204 indexed S4 may indicate a delay of N−3 slots.

FIG. 8 illustrates a BWP switching scheme 800 according to some embodiments of the present disclosure. The scheme 800 may use substantially similar to the scheme 600, and may use the same reference numerals as in FIG. 6 for simplicity's sake. However, the scheme 800 may include a BWP switching command in a last data burst of a series of scheduled data bursts. As shown, the BS encodes a BWP switching command 810 in the last data burst 320e. In an example, the BWP switching command 810 may be carried in a MAC CE. The MAC CE may be part of a data payload of the last data burst 320e.

In an embodiment, a BS (e.g., the BSs 105 and/or 500) may employ any suitable combinations of the schemes 600, 700, and/or 800 to configure a UE with BWP switching information. The BS may transmit BWP switching information (e.g., the BWP switching information 610, 710, and/or the BWP switching command 810) along with DL transmissions (e.g., the DL data bursts 320). The BS may transmit the BWP switching information via a DCI (e.g., in a scheduling grant 606) or via a MAC CE within a data burst 320. As can be observed from the schemes 600, 700, and 800, the BWP switching information allows the UE to quickly switch to the narrowband BWP 304 after receiving a last DL data burst (e.g., the last data burst 320e) without having to wait for a long delay (e.g., the delay 352) as in the scenario 300. When employing the schemes 600, 700, and/or 800, the UE may transmit an ACK/NACK for the last data burst 320e in the wideband BWP 302 or in the narrowband BWP 304 using various mechanisms as described in greater detail below.

Figure 9:
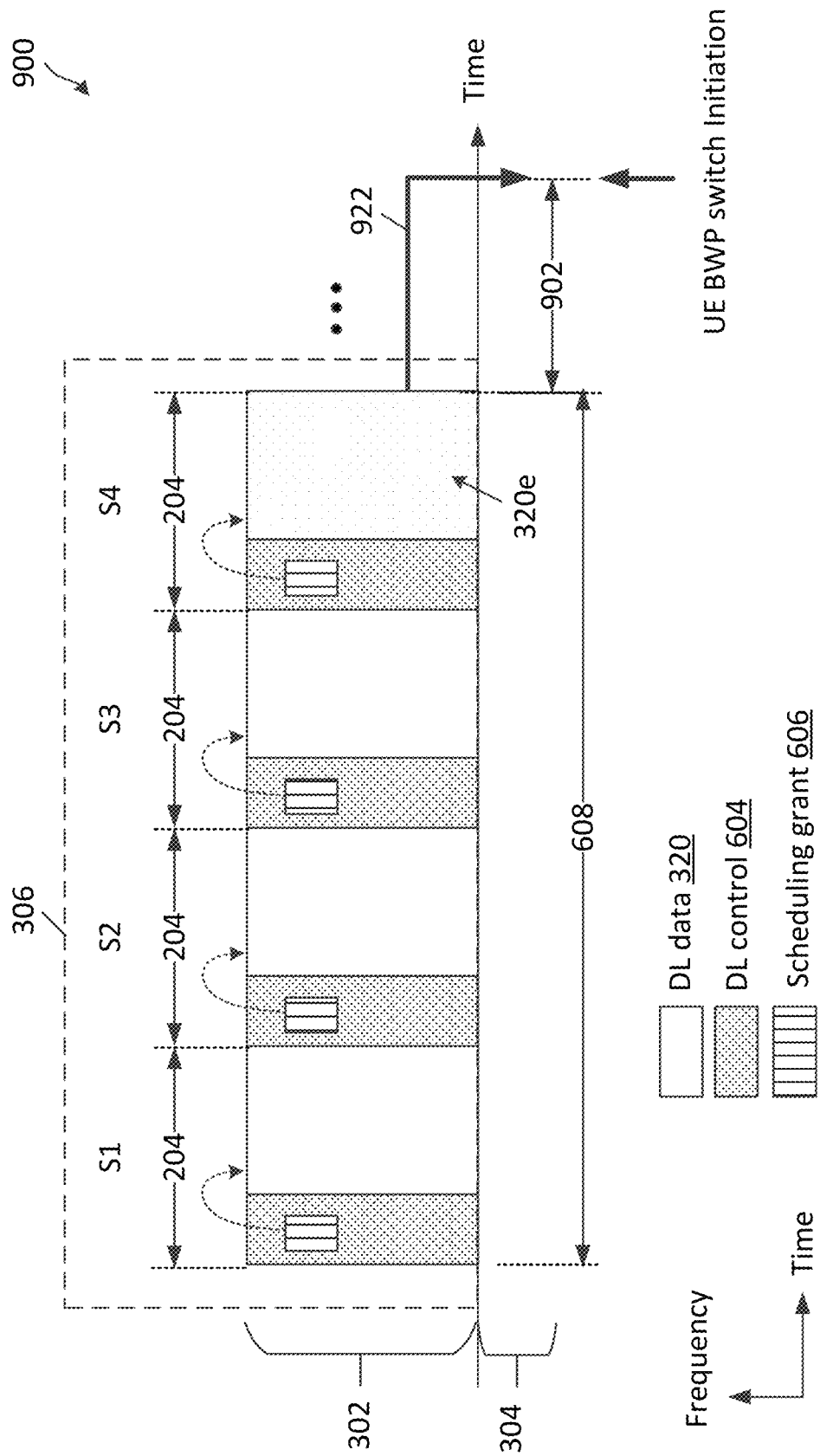
FIG. 9 illustrates a BWP switching scheme according to some embodiments of the present disclosure.

FIG. 9 illustrates a BWP switching scheme 900 according to some embodiments of the present disclosure. The scheme 900 may be employed by a BS such as the BSs 105 and/or 500 and a UE such as the UEs 115 and/or 400 in a network such as the network 100 operating over a shared frequency band or an unlicensed frequency band. In particular, the BS may schedule a UE for DL data transmissions and configure the UE to perform a BWP switch autonomously after receiving the DL data transmissions as shown in the scheme 900. The scheme 900 is described using the same DL scheduling configuration as in the scheme 600, and may use the same reference numerals as in FIG. 6 for simplicity's sake. In FIG. 9, the x-axis represents time in some arbitrary units, and the y-axis represents frequency in some arbitrary units.

In the scheme 900, a BS (e.g., the BSs 105 and/or 500) configures a UE (e.g., the UEs 115 and/or 400) to autonomously perform a BWP switch after receiving last data burst in a series of scheduled data bursts. As shown, the UE initiates a BWP switch 922 from the wideband BWP 302 to the narrowband BWP 304 without a trigger from the BS. The initiation is based on the reception of the last data burst 320e.

In an example, the UE may perform the BWP switch 922 based on having successfully received all scheduled DL data bursts 320 in the period 608. In a first configuration, the UE may perform the BWP switch 922 after transmitting ACK/NACKs for all the scheduled DL data bursts 320 to the BS. In a second configuration, the UE may perform the BWP switch 922 before it transmits ACK/NACKs for all the scheduled DL data bursts. In some instances, the UE may select between the first configuration and the second configuration in a communication session. The BS may provide ACK/NACK resources and a codebook configuration for the narrowband BWP. In another example, the UE performs the BWP switch 922 after receiving all scheduled DL data bursts 320 irrespective of whether the DL data bursts 320 are received successfully. However, if the UE miss detects a scheduling grant 606, the UE may not know that a DL data burst 320 is scheduled for the UE.

To assist the UE in determining whether all DL data bursts (e.g., in the period 608) scheduled for the UE are received, the BS may indicate to the UE how many DL data bursts 320 are transmitted by the BS in each scheduling grant 606. The indication can be via a DAI and the UE may count the number of DL scheduling grants 606 received or the number of DL data bursts 320 received in a similar manner as in the scheme 600 discussed above with respect to FIG. 6. Additionally or alternatively, the BS may indicate the number ACK/NACKs (e.g., the ACK/NACKs 322) that the BS is expecting from the UE. In an example, the BS may configure the UE with a semi-static codebook for transmitting ACK/NACKs. Thus, the UE may not be able to determine the number of ACK/NACKs to be sent to the BS based on the semi-static codebook. Thus, the indication of the number of expected ACK/NACKs can be useful when the UE is configured with a semi-static codebook. Additionally or alternatively, the BS may indicate the HARQ process (e.g., a HARQ process identifier) of the DL data bursts 320 and the number of expected ACK/NACKs from the UE in a MAC CE. The UE may use any suitable combinations of the above indications (in the DAI or MAC CE) to determine whether the UE has received all scheduled DL data bursts 320 (in the period 608) from the BS.

Referring to the example where the UE performs the BWP switch 922 irrespective of whether the DL data bursts 320 are received successfully, the UE may fail to decode a DL data burst 320, but already switched to the narrowband BWP 304. The BS can trigger the UE to perform a BWP switch to the wideband BWP 302 to receive a retransmission of the failed DL data burst 320.

In an embodiment, the BS may indicate to the UE which of the schemes 600, 700, 800, or 900 to use for performing BWP switch via a RRC configuration. The RRC configuration may indicate whether the UE may perform the BWP switch irrespective of having received all scheduled DL data bursts 320 successfully.

In an embodiment, when the UE applies the schemes 600, 700, 800, or 900, the UE may further determine whether there is any UL data pending for transmission. For example, the UE may have transmitted a scheduling request (SR) to the BS, but no UL scheduling grant has been received from the BS. The UE may remain in the wideband BWP 302 instead of switching to the narrowband BWP 304.

In an embodiment, when the UE applies the schemes 600, 700, 800, or 900, the UE may continue to monitor the wideband BWP 302 for communications from the BS between the time when the UE completed receiving the last data burst 320e and when the UE performs the BWP switch (e.g., the BWP switch 622, 722, 822, and 922). In an example, if the UE receives a DL scheduling grant and/or a UL scheduling grant from the BS before performing a BWP switch, the UE may discard or terminate the BWP switch procedure and continue to perform DL reception and/or UL transmission within the wideband BWP.

In some examples, the UE may transmit ACK/NACKs (e.g., the ACK/NACKs 322) in the wideband BWP 302 for all scheduled DL data bursts 320 before switching to the narrowband BWP 304. Various scenarios can occur depending on whether the UE can successfully decode all the scheduled DL data bursts 320 and whether the BS can successfully receive all the corresponding ACK/NACKs. In a first scenario, the UE successfully decodes all scheduled DL data bursts 320 and the BS receives all the ACK/NACKs for the DL data burst 320. In a second scenario, the UE fails to decode one or more of the DL data bursts 320 and the BS receives all the ACK/NACKs for the DL data burst 320. In a third scenario, the UE successfully decode all the DL scheduled data bursts 320 and the BS fails to receive one or more of the ACK/NACKs. In a fourth scenario, the UE fails to decode one or more of the DL data bursts and the BS fails to receive one or more of the ACK/NACKs. In the first and second scenarios, the BS can determine which BWP is an active BWP of the UE (e.g., currently monitoring by the UE). However, the BS may not be able to determine the active BWP of UE in the third and fourth scenarios.

Figure 10:
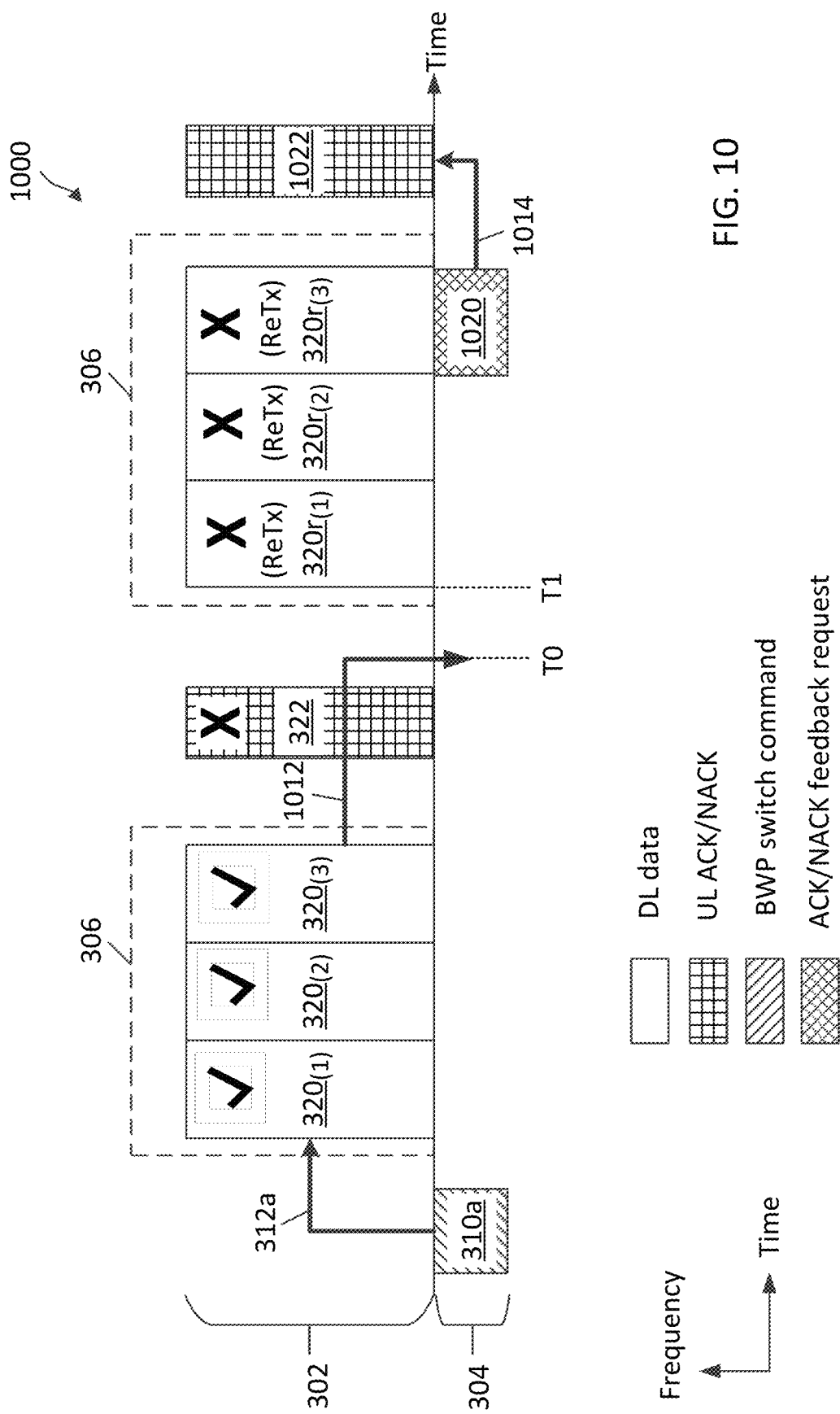
FIG. 10 illustrates a BWP switching scheme with error handling according to some embodiments of the present disclosure.
Figure 11:
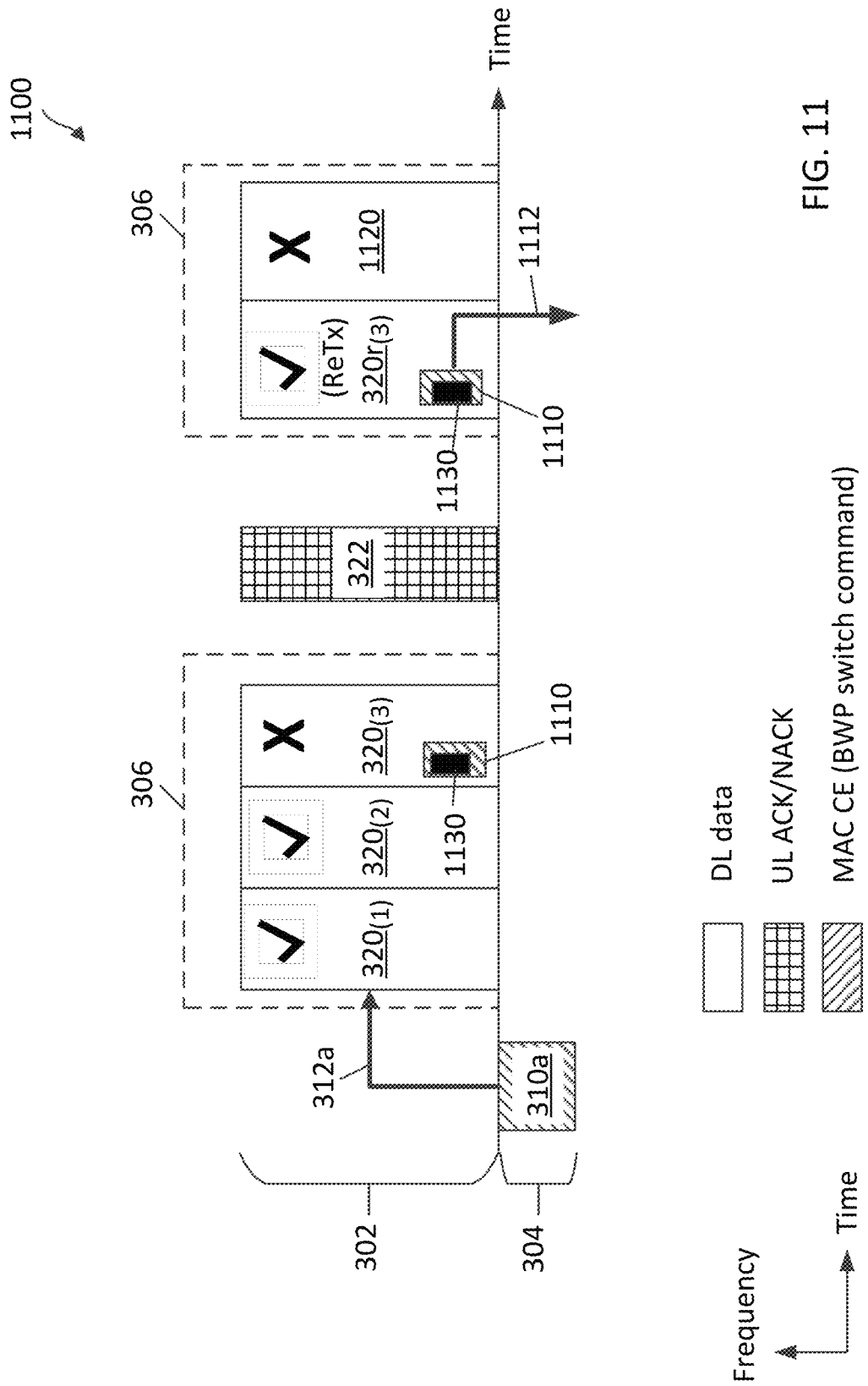
FIG. 11 illustrates a BWP switching scheme with error handling according to some embodiments of the present disclosure.
Figure 12:
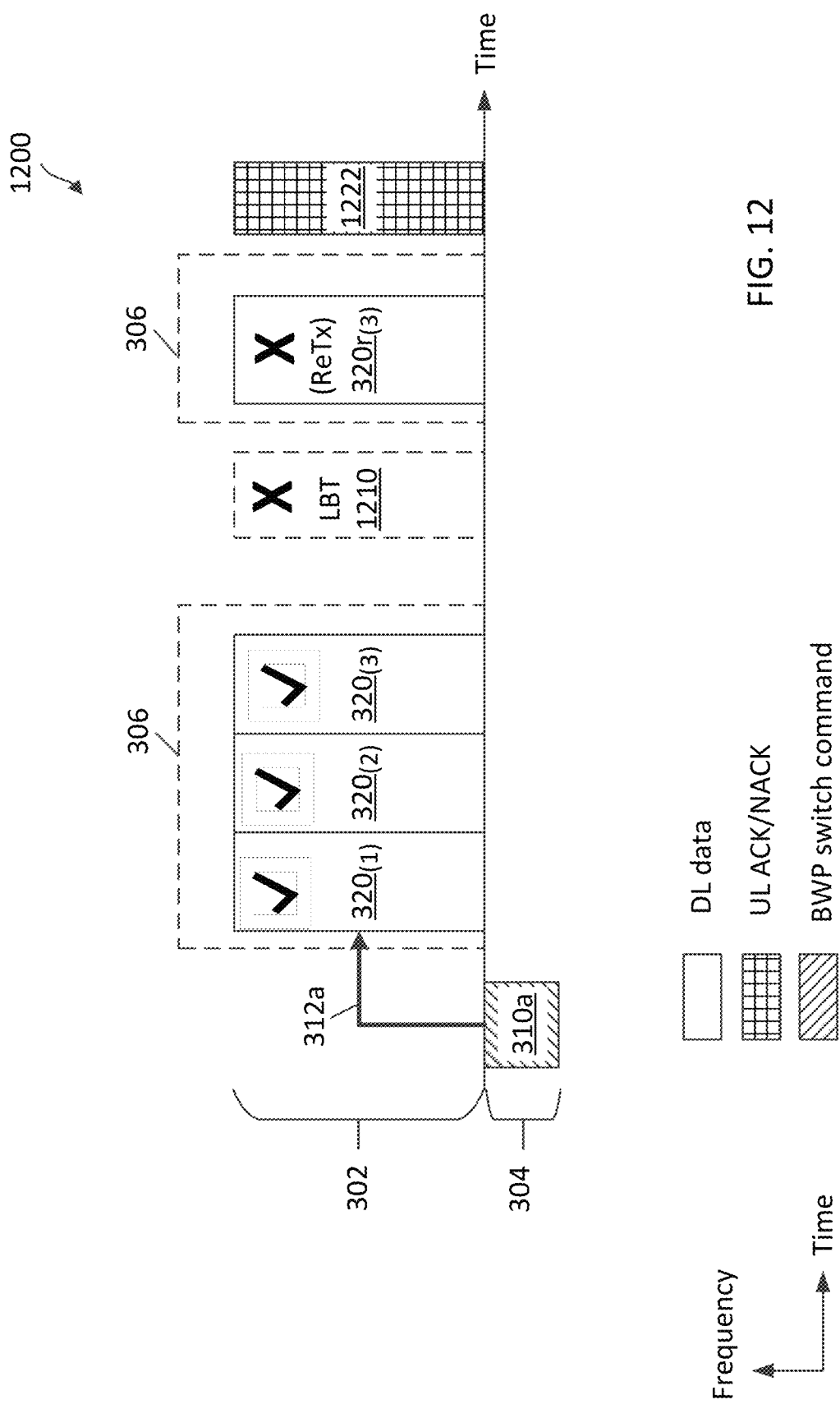
FIG. 12 illustrates a BWP switching scheme with error handling according to some embodiments of the present disclosure.

FIGS. 10-12 illustrate various mechanisms for handling error scenarios in BWP switching, for example, when applying the schemes 600, 700, 800, and/or 900 discussed above with respect to FIGS. 6, 7, 8, and/or 9. In FIGS. 10-12, the schemes 1000, 1100, and/or 1200 may be employed by a BS such as the BSs 105 and/or 500 and a UE such as the UEs 115 and/or 400 in a network such as the network 100 operating over a shared frequency band or an unlicensed frequency band. Additionally, in FIGS. 10-12, the x-axes represent time in some arbitrary units, and the y-axes represent frequency in some arbitrary units. Further, the schemes 1000-1200 are described using the transmission/structure shown in FIG. 2 and the BWP configuration shown in FIG. 3, and may use the same reference numerals as in FIGS. 2 and 3 for simplicity's sake. For simplicity of illustration and discussion, FIGS. 10-12 may not show a COT (e.g., the COT 306) for all transmissions, though it should be understood that transmissions should occur within a COT (e.g., after a successful LBT in a corresponding BWP 302 or 304). Further, the schemes 1000-1200 are illustrated with three scheduled DL data bursts 320, but can be scaled to include any suitable number of scheduled DL data bursts 320 (e.g., about 1, 2, 4, 5, or more).

FIG. 10 illustrates a BWP switching scheme 1000 with error handling according to some embodiments of the present disclosure. Similar to the scenario 300, a BS (e.g., the BSs 105 and/or 400) triggers a UE (e.g., the UEs 115 and/or 500) to switch from the narrowband BWP 304 to the wideband BWP 302 via a BWP switching command 310a sent in the narrowband BWP 304. The BS schedules the UE with three DL data bursts 320 (shown as $320_{(1)}$, $320_{(2)}$, and $320_{(3)}$) in the wideband BWP 302. The UE successfully receives the DL data bursts $320_{(1)}$, $320_{(2)}$, and $320_{(3)}$ as shown by the checkmarks. The UE transmits an ACK/NACK 322 (a group ACK/NACK) for the DL data bursts 320. At time T0, after transmitting the ACK/NACK 322, the BS switches to the narrowband BWP 304 (shown by the arrow 1012), for example, utilizing the schemes 600, 700, 800, and/or 900 discussed above. After the BWP switch 1012, the UE monitors for communication from the BS in the narrowband BWP 304.

The BS fails to receive and/or decode the ACK/NACK 322 as shown by the cross symbol. The BS may retransmit DL data bursts corresponding to missed ACK/NACKs. For example, the BS misses all ACK/NACKs for all three DL data bursts $320_{(1)}$, $320_{(2)}$, and $320_{(3)}$. Thus, at time T1, the BS acquires another COT 306 in the wideband BWP 302 and retransmits the DL data bursts $320_{(1)}$, $320_{(2)}$, and $320_{(3)}$ (shown as $320r_{(1)}$, $320r_{(2)}$, and $320r_{(3)}$) in the acquired COT 306. The UE is monitoring the narrowband BWP 304 during the retransmission, and thus may not receive the retransmitted DL data bursts $320r_{(1)}$, $320r_{(2)}$, and $320r_{(3)}$.

When the BS determines that no ACK/NACK is received from the UE for the retransmitted DL data bursts $320r_{(1)}$, $320r_{(2)}$, and $320r_{(3)}$, the BS transmits an ACK/NACK feedback request 1020 to the UE in the narrowband BWP 304. The ACK/NACK feedback request 1020 can be transmitted via a DCI. The ACK/NACK feedback request 1020 triggers the UE to transmit an ACK/NACK in the wideband BWP 302 for the retransmitted DL data bursts $320r_{(1)}$, $320r_{(2)}$, and $320r_{(3)}$. Upon receiving the ACK/NACK feedback request 1020, the UE performs a BWP switch 1014 to the wideband BWP 302 and transmits an ACK/NACK 1022 in the wideband BWP 302. The ACK/NACK 1022 may indicate an ACK for each of the DL data bursts $320_{(1)}$, $320_{(2)}$, and $320_{(3)}$ since the UE already successfully decoded the DL data bursts $320_{(1)}$, $320_{(2)}$, and $320_{(3)}$.

In an example, the BS may request the UE to transmit an ACK/NACK for the DL data bursts $320_{(1)}$, $320_{(2)}$, and $320_{(3)}$ in the narrowband BWP 304 after missing the ACK/NACK 322. The UE may transmit an ACK/NACK state to the BS in the narrowband BWP 304, for example, indicating whether the UE has transmitted the ACK/NACK 322. In any case, the BS may retransmit the DL data bursts $320_{(1)}$, $320_{(2)}$, and $320_{(3)}$ in the wideband BWP 302 after failing to receive the ACK/NACK 322.

In an example, if the UE fails to decode one or more of the DL data bursts $320_{(1)}$, $320_{(2)}$, and $320_{(3)}$ in the wideband BWP 302, the UE may continue to monitor the wideband BWP 302 and may receive the retransmission from the BS. Mechanisms for sending ACK/NACKs to the BS are described in greater detail herein below.

FIG. 11 illustrates a BWP switching scheme 1100 with error handling according to some embodiments of the present disclosure. The scheme 1100 illustrates a scenario when a BS (e.g., the BSs 105 and/or 500) encodes a BWP switching command (e.g., BWP switching command 810) within a last scheduled data burst as discussed above in the scheme 800 and mechanisms for resolving ambiguity in the BWP switching command when the last data burst is retransmitted. Similar to the scheme 1000, the BS schedules a UE (e.g., the UEs 115 and/or 400) with three DL data bursts $320_{(1)}$, $320_{(2)}$, and $320_{(3)}$ in the wideband BWP 302. The last data burst $320_{(3)}$ includes MAC CE 1110 including a BWP switching command (e.g., the BWP switching command 810). The UE successfully receives the DL data burst $320_{(1)}$ and $320_{(2)}$ (shown by the checkmarks), but fails to receive (shown by the cross symbol). The UE transmits an ACK/NACK 322 indicating a NACK for the DL data burst $320_{(3)}$. Upon receiving, a NACK in the ACK/NACK 322, the BS retransmits the DL data burst $320_{(3)}$ (shown as $320r_{(3)}$). Additionally, the BS may transmit another DL data burst 1120 to the UE following the retransmitted DL data burst $320r_{(3)}$. The retransmitted DL data burst $320r_{(3)}$ is a retransmission of the DL data burst $320_{(3)}$ where the data payload remains the same. Thus, the retransmitted DL data burst $320r_{(3)}$ also includes the MAC CE 1110. The UE may perform a BWP switch 1112 to narrowband BWP 304 after receiving the retransmitted DL data burst $320r_{(3)}$ and misses the following DL data burst 1120.

As can be observed, a retransmission of a last data burst 320 with a BWP switching command can cause the UE to mistakenly switch to the narrowband BWP 304 and misses a subsequent scheduled transmission. To assist the UE in determining whether a BWP switching command is invalid, the BS may include a timestamp in the MAC CE 1110. For example, when the MAC CE 1110 includes a timestamp 1130 indicating that the MAC CE 1110 is generated for slot N (e.g., the slot 204) where the DL data burst $320_{(3)}$ is initially transmitted. When the UE receives the MAC CE 1110 in the retransmitted DL data burst $320r_{(3)}$ at slot N+k, the UE may compare a time or slot during which the retransmitted DL data burst $320r_{(3)}$ is received to the timestamp 1130 included in the MAC CE 1110. Upon detecting a mismatch, the UE may determine that the BWP switching command is invalid and refrain from performing the BWP switch 1112. In another example, the BS may retransmit a DL data burst with a BWP switching command at the end of a series of DL schedules. For example, the BS may transmit the DL data burst $320r_{(3)}$ after the DL data burst 1120 so that the UE may receive the DL data bursts 1120 and $320r_{(3)}$ and then performs a BWP switch to the narrowband BWP 304.

FIG. 12 illustrates a BWP switching scheme 1200 with error handling according to some embodiments of the present disclosure. The scheme 1200 is substantially similar to the scheme 1000, and illustrates a scenario when a UE (e.g., the UEs 115 and/or 400) fails to transmit an ACK/NACK due to LBT failure. As shown, a BS (e.g., the BSs 105 and/or 500) schedules the UE with three DL data bursts $320_{(1)}$, $320_{(2)}$, and $320_{(3)}$ in the wideband BWP 302. The UE successfully receives the DL data bursts $320_{(1)}$, $320_{(2)}$, and $320_{(3)}$ in the wideband BWP 302 (shown by the checkmarks). The UE performs an LBT 1210, but fails to win the contention (shown by the cross symbol). Thus, the UE may not transmit an ACK/NACK for one or more of the DL data bursts $320_{(1)}$, $320_{(2)}$, and $320_{(3)}$. The UE continues to monitor for a communication from the BS in the wideband BWP 302. As an example, the UE may fail to transmit an ACK/NACK for only the last DL data burst $320_{(3)}$.

When the BS fails to detect an ACK/NACK for the for the DL data burst $320_{(3)}$, the BS retransmits the DL data bursts $320_{(3)}$ (shown as $320r_{(3)}$) in the wideband BWP 302. Since the UE is monitoring the wideband BWP 302, the UE may receive the retransmitted DL data burst $320r_{(3)}$ and may subsequently perform an LBT and transmit an ACK/NACK 1222 for the DL data burst $320r_{(3)}$ to the BS.

In another example, upon the failure of the LBT 1210, the UE may switch to the narrowband BWP 304, for example, to save power, and rely on the BS to trigger an ACK/NACK request. For example, the BS may monitor the wideband BWP 302 and the narrowband BWP 304 to determine which of the BWPs 302 and 304 is an active BWP of the UE as discussed above in FIG. 10 and further below in FIG. 13. In some examples, the UE may perform the BWP switch upon an LBT failure if all scheduled DL data bursts $320_{(1)}$, $320_{(2)}$, and $320_{(3)}$ are received successfully.

FIGS. 13A and 13B collectively illustrate an ACK/NACK communication scheme 1300 with BWP switching according to embodiments of the present disclosure. The scheme 1300 may be employed by a BS such as the BSs 105 and/or 500 and a UE such as the UEs 115 and/or 400 in a network such as the network 100 operating over a shared frequency band or an unlicensed frequency band. The scheme 1300 may be used in conjunction with the schemes 600, 700, 800, and/or 900 discussed above with respect to FIGS. 6, 7, 8, and/or 9. The scheme 1300 is described using a similar scheduling scenario as in the scheme 1000, 1100, and 1200, and may use the same reference numerals as in FIGS. 10, 11, and 12 for simplicity's sake. In FIGS. 13A and 13B, the x-axes represent time in some arbitrary units, and the y-axes represent frequency in some arbitrary units. For simplicity of illustration and discussion, FIGS. 13A and 13B may not show a COT (e.g., the COT 306) for all transmissions, though it should be understood that transmissions should occur within a COT (e.g., after a successful LBT in a corresponding BWP 302 or 304).

In the scheme 1300, the BS fails to receive an ACK/NACK for one or more of the scheduled DL data bursts 320 from the UE before the UE switches to the narrowband BWP 304 as shown by the arrow 1312. The missing ACK/NACK may be due to an UL error or a DL error. An UL error may be caused by the UE failing to win a contention in the wideband BWP 302, and thus may not transmit an ACK/NACK in the wideband BWP 302. An UL error may be due to a UL channel condition (e.g., a low signal-to-noise error (SNR)) that prevents the BS from receiving an ACK/NACK transmitted by the UE. A DL error may be due to a poor DL channel condition that causes the UE to miss-detect a DL scheduling grant, and thus the UE may not transmit any ACK/NACK for the data burst. Alternatively, the UE may simply switch to the narrowband BWP 304 without transmitting any ACK/NACK in the wideband BWP 302, for example, when using the scheme 900. As an example, the BS misses an ACK/NACK for the last DL data burst $320_{(3)}$.

In a first configuration 1302, upon detecting that an ACK/NACK for the DL data burst $320_{(3)}$ is not received from the UE in the in the wideband BWP 302, the BS transmits an ACK/NACK feedback request 1310 (e.g., the ACK/NACK feedback request 1020) in the narrowband BWP 304. The ACK/NACK feedback request 1310 can be transmitted via a DCI (e.g., the DCIs 220 and 222). The ACK/NACK feedback request 1310 requests the UE to transmit an ACK/NACK for the DL data burst $320_{(3)}$ in the wideband BWP 302. Upon receiving the ACK/NACK feedback request 1310, the UE performs a BWP switch 1314 to the wideband BWP 302. Upon a successful LBT 1330 in the wideband 302, the UE transmits an ACK/NACK 1322 in the wideband BWP 302. After transmitting the ACK/NACK 1322, the UE switches back to the narrowband BWP 304 as shown by the arrow 1316.

The first configuration 1302 may cause an interruption time 1306 in communications in the narrowband BWP 304. The interruption time 1306 includes the time duration to switch from the narrowband BWP 304 to the wideband BWP 302, the time duration for the LBT 1330 (e.g., a CAT4 LBT with random backoff), the time duration for transmitting the ACK/NACK 1322, and the time duration for performing the BWP switch 1316.

In a second configuration 1304, upon detecting that an ACK/NACK for the DL data burst $320_{(3)}$ is not received from the UE in the in the wideband BWP 302, the BS transmits an ACK/NACK feedback request 1320 in the narrowband BWP 304, for example, via a DCI. The ACK/NACK feedback request 1320 requests the UE to transmit an ACK/NACK for the DL data burst $320_{(3)}$ in the narrowband BWP 304. Upon receiving the ACK/NACK feedback request 1320, the UE transmits an ACK/NACK 1324 in the narrowband BWP 304. The BS may configure the UE with a codebook for transmitting the ACK/NACK 1324 according to the narrowband BWP 304. The ACK/NACK codebook for the narrowband BWP 304 may have different size and/or parameters compared to a ACK/NACK codebook for the wideband BWP 302 due to the different BWs.

In an embodiment, the UE may determine when to perform a BWP switch and/or whether to perform a BWP switch depending on whether the UE is configured to use the schemes 600, 700, 800, or 900. In an example, when the UE performs an autonomous BWP switch as shown in the scheme 900, the UE may not transmit any ACK/NACK and rely on the BS to trigger an ACK/NACK request (e.g., as shown in the configuration 1302 and 1304). In another example, when the UE is configured to perform a BWP switch based on a last data burst indicator or a BWP switch command (e.g., the BWP switch command 810) transmitted in a MAC CE (e.g., the MAC CE 1110) of a last data burst (e.g., the last data burst 320e) as shown in the schemes 800 and/or 1100, the UE may switch to the narrowband BWP 304 after a certain time period (e.g., about 3 ms) to allow time for the upper layer (e.g., the MAC layer) of the UE to process the MAC CE. Thus, the UE may transmit an ACK/NACK for the last data burst in the wideband BWP 302 before switching to the narrowband BWP 304. In general, the BS and the UE may use any suitable combination of the schemes 600-1300 discussed above for BWP switching and/or ACK/NACK communications.

Figure 14:
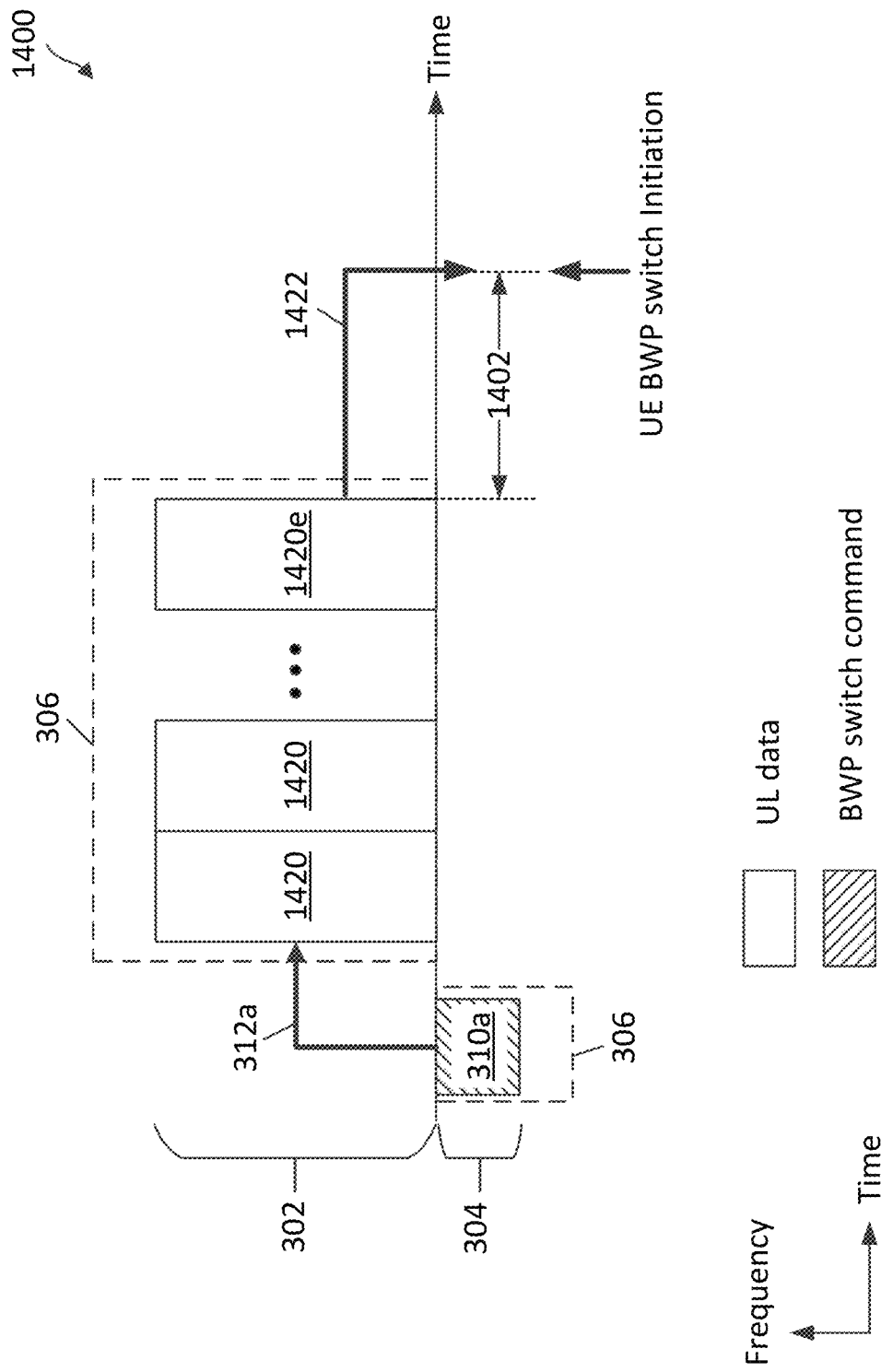
FIG. 14 illustrates a BWP switching scheme according to some embodiments of the present disclosure.

FIG. 14 illustrates a BWP switching scheme 1400 according to embodiments of the present disclosure. The scheme 1400 may be employed by a BS such as the BSs 105 and/or 500 and a UE such as the UEs 115 and/or 400 in a network such as the network 100 operating over a shared frequency band or an unlicensed frequency band. In particular, the BS may configure the UE to autonomously switches to a narrowband BWP 304 after communicating UL data as shown in the scheme 1400. The scheme 1400 is described using a similar BWP configuration as in the scenario 300, and may use the same reference numerals as in FIGS. 10, 11, and 12 for simplicity's sake. In FIG. 14, the x-axis represent time in some arbitrary units, and the y-axis represent frequency in some arbitrary units.

As shown, a BS (e.g., the BSs 105 and/or 400) triggers a UE (e.g., the UEs 115 and/or 500) to switch from the narrowband BWP 304 to the wideband BWP 302 via a BWP switching command 310a sent in the narrowband BWP 304. The BS schedules the UE to transmit a plurality of UL data bursts 1420 in the wideband BWP 302. Upon gaining a COT 306 after a successful LBT, the UE transmits the UL data bursts 1420 as scheduled by the BS. After transmitting the last data burst 1420e, the UE waits for a time period 1402 and switches to the narrowband BWP 304. As described above, when a BS fails to receive a UL data burst from the UE, the BS may schedule the UE to retransmit the UL data burst. Thus, the time period 1402 may allow time for the BS to process the last UL data burst 1420e and reschedule any missed UL data bursts 1420. In an example, the time period 1402 can be predetermined (e.g., about 10 ms or any suitable time duration). In another example, the BS can configure the UE with the time period 1402 via a RRC configuration. In some examples, when the UE switches to the narrowband BWP 304 before the BS schedules a retransmission for one or more of the UL data bursts 1420, the BS may trigger the UE to switch to the wideband BWP 302 for the UL retransmission, via a BWP switch command similar to the BWP switch command 310*a*.

In an example, when a UE (e.g., the UEs 115 and/or 400) employs the BWP switching schemes 600, 700, 800, 900, and/or 1400, the UE may continue to monitor the wideband BWP 302 in a period between the time (e.g., at time T0) when the UE completed communicating a last data burst (e.g., the last DL data burst 320*e* or the last UL data burst 1420*e*) and the time (e.g., at time T1) when the UE initiates the BWP switch (e., the BWP switch 622, 722, 822, 922, and 1422). In a first example, if the UE receives a DL scheduling grant (e.g., the DL scheduling grants 606) and/or a UL scheduling grant from the BS during the monitoring period (e.g., from time T0 to time T1), the UE may not proceed with the BWP switch and continue to communicate with the BS in the wideband BWP 302. In a second example, if the UE receives a DL scheduling grant or a UL scheduling grant from the monitoring, the UE may proceed with the BWP switch and discard the received grant. Thus, the interruption time for communication between the BS and the UE may include the duration of the BWP switch. The BWP switch duration may correspond to the UE's frontend reconfiguration duration. For example, the BWP switching duration may begin when the UE initiates a reconfiguration of the UE's frontend components to switch communication from a first BWP (e.g., the wideband BWP 302) to a second BWP (e.g., the narrowband BWP 304) and may end when the UE is ready to communicate the in the second BWP. The interruption time may be predetermined or based on UE's capability. For example, the UE may send a capability report to the BS indicating the BWP switching duration. The BS may schedule the UE taking the interrupt time into consideration. For example, the BS may not schedule the UE for any communication during the interruption time.

In another example, the UE is not expected to receive any UL scheduling grant or DL scheduling grant from the BS between the time when the UE completed communicating the last data burst and when the UE performs the BWP switch from the first BWP to the second BWP. In such an example, the communication interruption time between the BS and the UE may begin at the end of the last data burst transmission until the BWP switch to the second BWP is completed (e.g., when the UE is ready for communication in the second BWP). Similarly, the UE may send a capability report to the BS indicating the BWP switching duration and the BS may schedule the UE taking the interrupt time into consideration.

While the schemes 600-1400 are described in the context of BWP switching, similar switching mechanisms can be applied to power state switching. For example, a BS (e.g., the BSs 105 and/or 500) may configure a UE (e.g., the UEs 115 and/or 400) with different DL channel monitoring modes (e.g., different PDCCH monitoring frequency or periodicity) for different power states. The BS may configure a UE with a first mode for frequent PDCCH monitoring, for example, during an active power state of the UE. Additionally, the BS may configure the UE with a second mode for less frequent PDCCH monitoring, for example, during an idle power state or low-power state. In some examples, the frequent PDCCH monitoring can be as often as per mini-slot or per symbol and the less frequency PDCCH monitoring can be at slot boundary. In one example, the BS may transmit power state switching information to the UE along with data burst transmissions. The power state switching information can be included in a scheduling grant (e.g., via a DCI in the scheduling grants 606) for a data burst (e.g., the DL data bursts 320) or within a payload of a data burst. The UE may switch to a different power state after receiving the data bursts from the BS (e.g., similar to the schemes 600-800). In another example, the BS may allow the UE to autonomously switch to another power state after completing a communication (e.g., UL data bursts 1420 or DL data bursts 320) with the BS (e.g., similar to the scheme 900). In some aspects, the BS may configure the UE with a power state switching command. The power state switching command may include at least one of power state switching information (e.g., different PDCCH monitoring frequency or periodicity) or BWP switching information, for example, the BWP switching information and/or BWP switching commands discussed above in relation to FIGS. 6-14.

Figure 15:
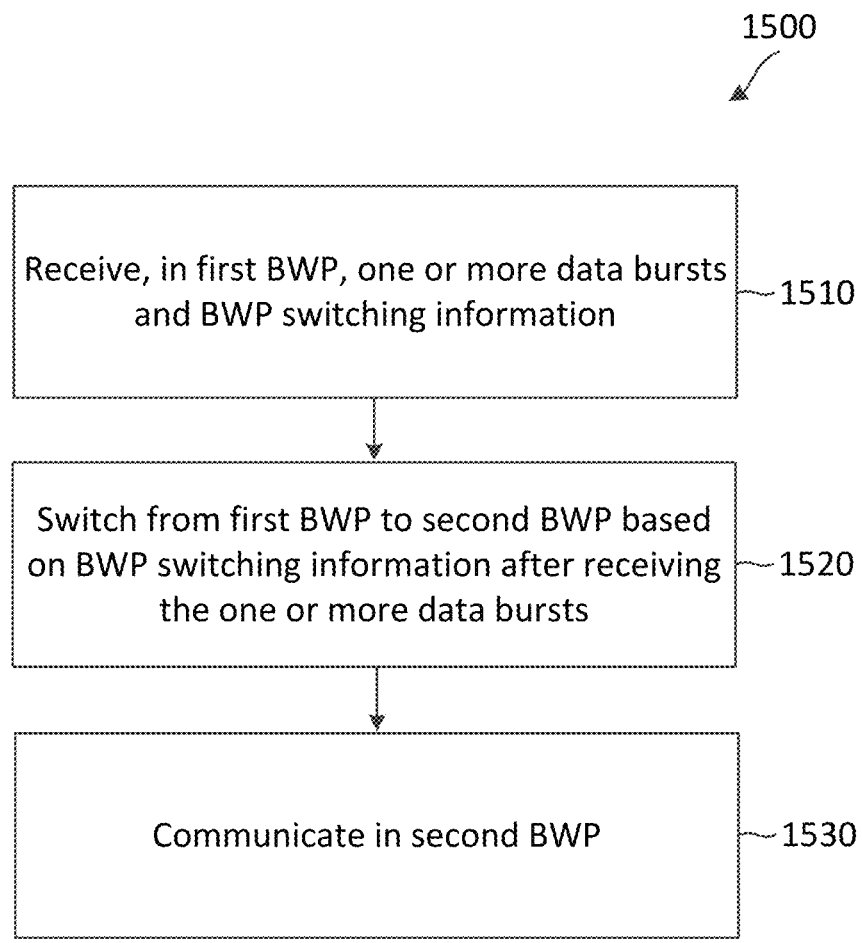
FIG. 15 is a flow diagram of a communication method according to some embodiments of the present disclosure.

FIG. 15 is a flow diagram of a communication method 1500 according to some embodiments of the present disclosure. Steps of the method 1500 can be executed by a computing device (e.g., a processor, processing circuit, and/or other suitable component) or other suitable means for performing the steps. For example, a wireless communication device, such as the UEs 115 and/or 400, may utilize one or more components, such as the processor 402, the memory 404, the communication module 408, the BWP switching module 409, the transceiver 410, the modem 412, and the one or more antennas 416, to execute the steps of method 1500. The method 1500 may employ similar mechanisms as in the schemes 600, 700, 800, 1000, 1100, 1200, and/or 1300 described above with respect to FIGS. 6, 7, 8, 10, 11, 12, and/or 13A-13B, respectively. As illustrated, the method 1500 includes a number of enumerated steps, but embodiments of the method 1500 may include additional steps before, after, and in between the enumerated steps. In some embodiments, one or more of the enumerated steps may be omitted or performed in a different order.

At step 1510, the method 1500 includes receiving, by the UE from a BS (e.g., the BSs 105 and/or 500) in a first BWP (e.g., the wideband BWP 302), one or more data bursts (e.g., the DL data bursts 320) and BWP switching information (e.g., the BWP switching information 610 and/or 710 and/or the BWP switching command 810).

At step 1520, the method 1500 includes switching, by the UE, from the first BWP to a second BWP (e.g., the narrowband BWP 304) based on the BWP switching information after receiving the one or more data bursts.

At step 1530, the method 1500 includes communicating, by the UE with the BS, a communication in the second BWP after the switching.

Figure 16:
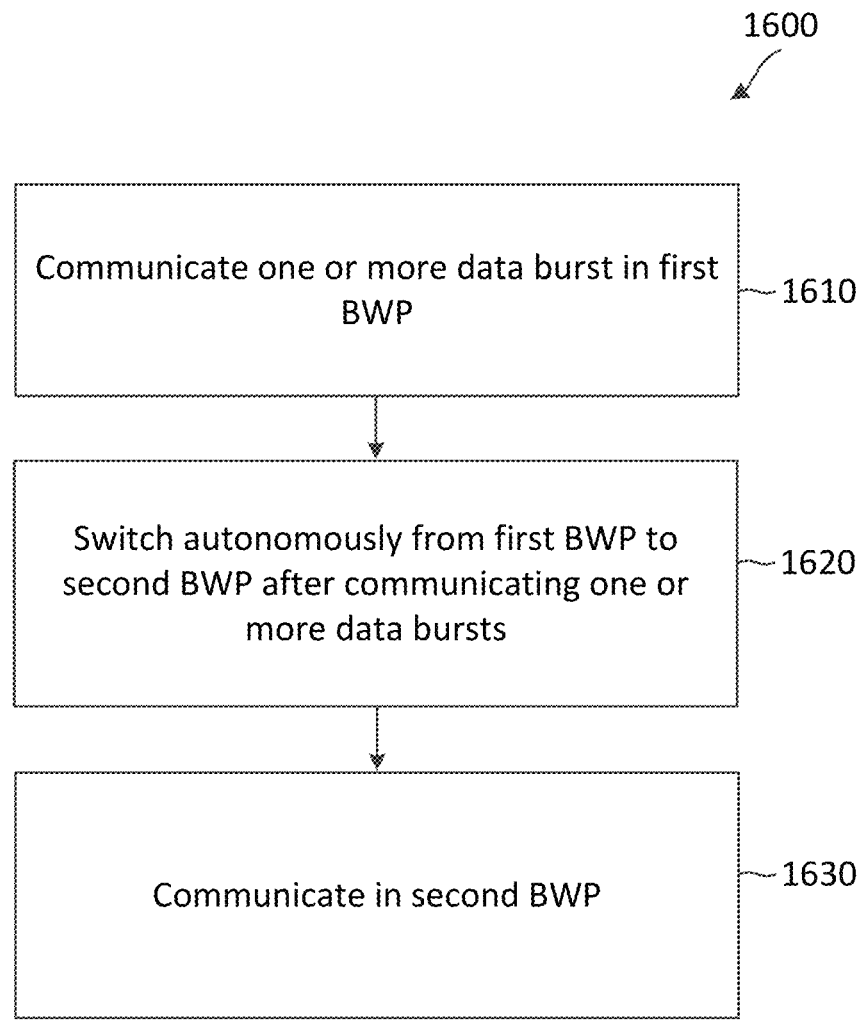
FIG. 16 is a flow diagram of a communication method according to some embodiments of the present disclosure.

FIG. 16 is a flow diagram of a communication method 1600 according to some embodiments of the present disclosure. Steps of the method 1600 can be executed by a computing device (e.g., a processor, processing circuit, and/or other suitable component) or other suitable means for performing the steps. For example, a wireless communication device, such as the UEs 115 and/or 400, may utilize one or more components, such as the processor 402, the memory 404, the communication module 408, the BWP switching module 409, the transceiver 410, the modem 412, and the one or more antennas 416, to execute the steps of method 1600. The method 1600 may employ similar mechanisms as in the schemes 900, 1000, 1100, 1200, 1300, and/or 1400 described above with respect to FIGS. 9, 10, 11, 12, 13A-13B, and/or 14, respectively. As illustrated, the method 1600 includes a number of enumerated steps, but embodiments of the method 1600 may include additional steps before, after, and in between the enumerated steps. In some embodiments, one or more of the enumerated steps may be omitted or performed in a different order.

At step 1610, the method 1600 includes communicating, by the UE with a BS e.g., the BSs 105 and/or 500) in a first bandwidth part (e.g., the wideband BWP 302), one or more data bursts (e.g., the DL data bursts 320 or the UL data bursts 1420).

At step 1620, the method 1600 includes switching, by the UE, autonomously from the first BWP to a second BWP (e.g., the narrowband BWP 304) different from the first BWP after communicating the one or more data bursts.

At step 1630, the method 1600 includes communicating, by the UE with the BS, a communication in the second BWP after the switching.

Figure 17:
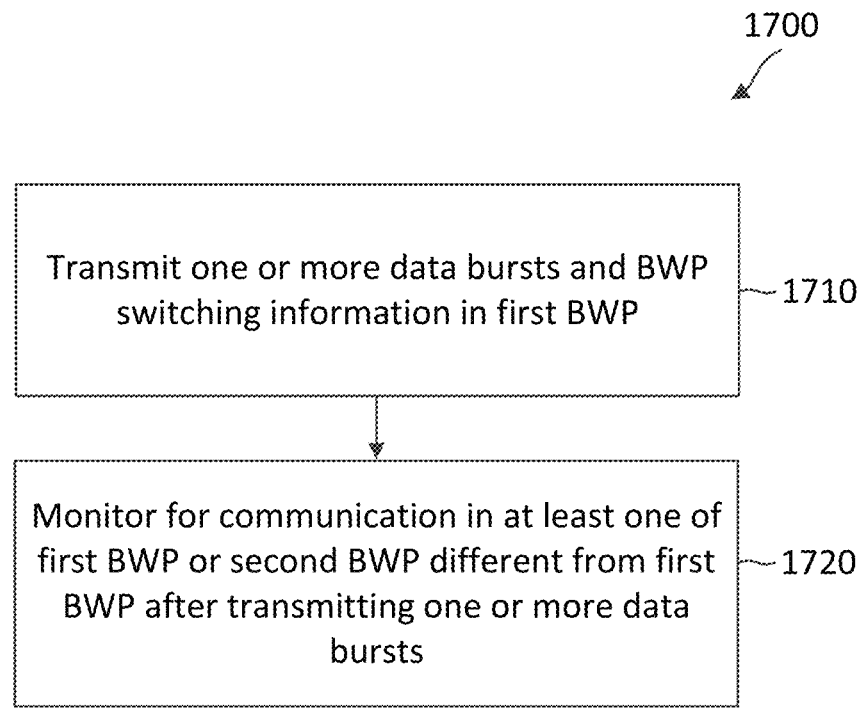
FIG. 17 is a flow diagram of a communication method according to some embodiments of the present disclosure.

FIG. 17 is a flow diagram of a communication method 1700 according to some embodiments of the present disclosure. Steps of the method 1700 can be executed by a computing device (e.g., a processor, processing circuit, and/or other suitable component) of a wireless communication device or other suitable means for performing the steps. For example, a wireless communication device, such as the BSs 105 and/or 500, may utilize one or more components, such as the processor 502, the memory 504, the communication module 508, the BWP switching module 509, the transceiver 510, the modem 512, and the one or more antennas 516, to execute the steps of method 1700. The method 1700 may employ similar mechanisms as in the schemes 600, 700, and/or 800 described above with respect to FIGS. 6, 7, and/or 8, respectively. As illustrated, the method 1700 includes a number of enumerated steps, but embodiments of the method 1700 may include additional steps before, after, and in between the enumerated steps. In some embodiments, one or more of the enumerated steps may be omitted or performed in a different order.

At step 1710, the method 1700 includes transmitting, by the BS to a UE (e.g., the UEs 115 and/or 400) in a first BWP (e.g., the wideband BWP 302), one or more data bursts (e.g., the DL data bursts 320) and BWP switching information (e.g., the BWP switching information 610, 710, 810).

At step 1720, the method 1700 includes monitoring, by the BS, for a communication from the UE in at least one of the first BWP or a second BWP (e.g., the narrowband BWP 304) different from the first BWP after transmitting the one or more data bursts.

Figure 18:
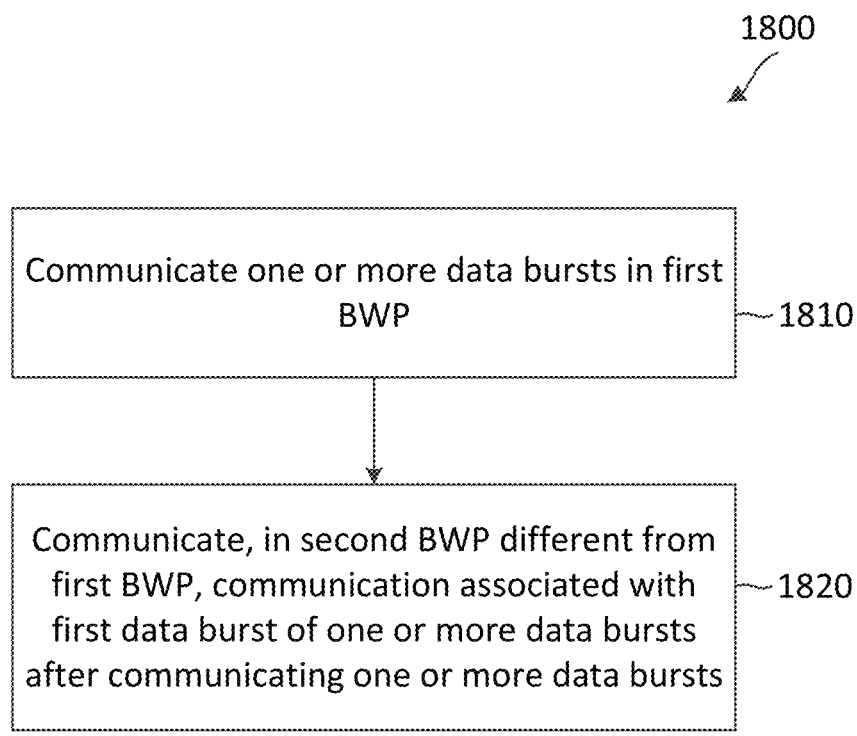
FIG. 18 is a flow diagram of a communication method according to some embodiments of the present disclosure.

FIG. 18 is a flow diagram of a communication method 1800 according to some embodiments of the present disclosure. Steps of the method 1800 can be executed by a computing device (e.g., a processor, processing circuit, and/or other suitable component) of a wireless communication device or other suitable means for performing the steps. For example, a wireless communication device, such as the BSs 105 and/or 500, may utilize one or more components, such as the processor 502, the memory 504, the communication module 508, the BWP switching module 509, the transceiver 510, the modem 512, and the one or more antennas 516, to execute the steps of method 1800. The method 1800 may employ similar mechanisms as in the schemes 900, 1000, 1100, 1200, 1300, and/or 1400 described above with respect to FIGS. 9, 10, 11, 12, 13A-13B, and/or 14, respectively. As illustrated, the method 1800 includes a number of enumerated steps, but embodiments of the method 1800 may include additional steps before, after, and in between the enumerated steps. In some embodiments, one or more of the enumerated steps may be omitted or performed in a different order.

At step 1810, the method 1800 includes communicating, by the BS with a UE (e.g., the UEs 115 and/or 400) in a first BWP (e.g., the wideband BWP 302), one or more data bursts (e.g., the DL data bursts 320 and/or UL data bursts 1420).

At step 1820, the method 1800 includes communicating, by the BS with the UE in a second BWP (e.g., the narrowband BWP 304) different from the first BWP, for a communication associated with a first data burst of the one or more data bursts after communicating the one or more data bursts.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method includes receiving, by a user equipment (UE) from a base station (BS) in a first bandwidth part (BWP), one or more data bursts and BWP switching information; switching, by the UE, from the first BWP to a second BWP based on the BWP switching information after receiving the one or more data bursts; and communicating, by the UE with the BS, a communication in the second BWP after the switching.

In some aspect, the method may also include one or more of the following features. The method includes where the receiving includes receiving, by the UE from the BS, a scheduling grant for a first data burst of the one or more data bursts, where at least one of the scheduling grant or the first data burst includes the BWP switching information. The first data burst corresponds to a last data burst of the one or more data bursts. The receiving includes receiving, by the UE from the BS, the BWP switching information including a last data burst indicator. The receiving includes receiving, by the UE from the BS, the BWP switching information indicating the second BWP. The receiving includes receiving, by the UE from the BS, the BWP switching information including a BWP switching command. The receiving includes receiving, by the UE from the BS, the first data burst including the BWP switching information and timing information associated with the BWP switching information. The switching is further based on a comparison between the timing information associated with the BWP switching information and timing information associated with the first data burst. The method may include transmitting, by the UE to the BS, a capability report indicating a BWP switching duration of the UE. The receiving includes receiving, by the UE from the BS, the BWP switching information indicating information associated with a number of remaining data bursts scheduled for the UE. The method may include receiving, by the UE from the BS, the BWP switching information indicating a delay for the switching. The method may include transmitting, by the UE to the BS in the first BWP before the switching, an acknowledgement/negative-acknowledgement (ACK/NACK) for a last data burst of the one or more data bursts. The switching is further based on a failure of the LBT. The method may include transmitting, by the UE to the BS in the second BWP, an acknowledgement/negative-acknowledgement (ACK/NACK) for a last data burst of the one or more data bursts. The transmitting is based on the request. The transmitting is further based on the received codebook parameter. The method may include receiving, by the UE from the BS in the second BWP, a request for an acknowledgement/negative-acknowledgement (ACK/NACK) for a last data burst of the one or more data bursts to be transmitted in the first BWP; switching, by the UE, from the second BWP to the first BWP in response to the request; and transmitting, by the UE to the BS in the first BWP, the ACK/NACK for the last data burst.

Further embodiments of the present disclosure include a method of wireless communication. The method includes communicating, by a user equipment (UE) with a base station (BS) in a first bandwidth part (BWP), one or more data bursts; switching, by the UE, autonomously from the first BWP to a second BWP different from the first BWP after communicating the one or more data bursts. The method of wireless communication also includes communicating, by the UE with the BS, a communication in the second BWP after the switching.

In some aspect, the method may also include one or more of the following features. The method includes where the switching includes delaying, by the UE, the switching by a delay time period after communicating a last data burst of the one or more data bursts. The method may include receiving, by the UE from the BS, a configuration indicating the delay time period. The communicating includes receiving, by the UE from the BS, the one or more data bursts. The switching is further based on a determination that the one or more data bursts are received successfully. The switching is performed irrespective of whether the one or more data bursts are received successfully. The communicating includes receiving, by the UE from the BS, information associated with a number of remaining data bursts scheduled for the UE; and the switching is further based on the received information associated with the number of remaining data bursts. The communicating includes receiving, by the UE from the BS, information associated with a number of acknowledgements/negative-acknowledgements (ACK/NACKs) expected from the UE; and the switching is further based on the received information associated with the number of ACK/NACKs expected. The switching is further based on a determination that there is no remaining transmission scheduled for the UE in the first BWP. The method may include receiving by the UE from the BS in the second BWP after the switching, a request for an acknowledgement/negative-acknowledgement (ACK/NACK) associated with the one or more data bursts. The method may include transmitting, by the UE to the BS, the ACK/NACK in response to the request. The communicating includes transmitting, by the UE to the BS, the one or more data bursts. The method may include transmitting, by the UE to the BS, a first data burst of the one or more data bursts; and retransmitting, by the UE to the BS, the first data burst.

Further embodiments of the present disclosure include a method of wireless communication. The method includes transmitting, by a base station (BS) to a user equipment (UE) in a first bandwidth part (BWP), one or more data bursts and BWP switching information. The method of wireless communication also includes monitoring, by the BS, for a communication from the UE in at least one of the first BWP or a second BWP different from the first BWP after transmitting the one or more data bursts.

In some aspect, the method may also include one or more of the following features. The method includes where the transmitting includes transmitting, by the BS to the UE, a scheduling grant for a first data burst of the one or more data bursts, where at least one of the scheduling grant or the first data burst includes the BWP switching information. The first data burst corresponds to a last data burst of the one or more data bursts. The transmitting includes transmitting, by the BS to the UE, the BWP switching information including a last data burst indicator. The transmitting includes transmitting, by the BS to the UE, the BWP switching information indicating the second BWP. The transmitting includes transmitting, by the BS to the UE, the BWP switching information including a BWP switching command. The transmitting includes transmitting, by the BS to the UE, the BWP switching information including timing information associated with the BWP switching command. The transmitting includes transmitting, by the BS to the UE, the BWP switching information indicating information associated with a number of remaining data bursts scheduled for the UE. The method may include transmitting, by the BS to the UE, the BWP switching information indicating a BWP switching delay. The method may include determining, by the BS, a schedule for a first data burst of the one or more data bursts based on a communication interruption time associated with a BWP switch. The determining is based on the BWP switching duration of the UE.

Further embodiments of the present disclosure include a method of wireless communication. The method includes communicating, by a base station (BS) with a user equipment (UE) in a first bandwidth part (BWP), one or more data bursts. The method of wireless communication also includes communicating, by the BS with the UE in a second BWP different from the first BWP, a communication associated with a first data burst of the one or more data bursts after communicating the one or more data bursts.

In some aspect, the method may also include one or more of the following features. The method includes where the communicating the one or more data bursts includes transmitting, by the BS to the UE, the one or more data bursts. The communicating the one or more data bursts includes transmitting, by the BS to the UE, information associated with a number of remaining data bursts scheduled for the UE. The communicating the one or more data bursts includes transmitting, by the BS to the UE, information associated with a number of ACK/NACKs expected from the UE. The communicating the communication associated with the one or more data bursts includes monitoring, by the BS, for an acknowledgement/negative-acknowledgement (ACK/NACK) for a last data burst of the one or more data bursts from the UE in the second BWP. The monitoring is further based on a determination that no ACK/NACK for the last data burst is received from the UE in the first BWP. The communicating the one or more data bursts includes transmitting, by the BS to the UE, the last data burst based on a retransmission schedule for a first data burst of the one or more data bursts. The method may include transmitting, by the BS to the UE in the second BWP, a request for the ACK/NACK. The method may include transmitting, by the BS to the UE in the second BWP, a request for an acknowledgement/negative-acknowledgement (ACK/NACK) for a last data burst of the one or more data bursts to be transmitted in the first BWP; and receiving, by the BS from the UE in the first BWP, the ACK/NACK for the last data burst in response to the request. The communicating the one or more data bursts includes receiving, by the BS from the UE, the one or more data bursts. The method may include transmitting, by the BS to the UE, a configuration indicating a BWP switching delay.

Further embodiments of the present disclosure include a use equipment (UE) includes a transceiver configured to receive, from a base station (BS) in a first bandwidth part (BWP), one or more data bursts and BWP switching information; switch the transceiver from communication in the first BWP to communication in a second BWP based on the BWP switching information after the one or more data bursts are received; and communicate, with the BS, a communication signal in the second BWP after the switching.

In some aspect, the UE may also include one or more of the following features. The UE includes where the transceiver configured to receive the one or more data bursts and the BWP switching information is further configured to receive, from the BS, a scheduling grant for a first data burst of the one or more data bursts, where at least one of the scheduling grant or the first data burst includes the BWP switching information. The first data burst corresponds to a last data burst of the one or more data bursts. The transceiver configured to receive the one or more data bursts and the BWP switching information is further configured to receive, from the BS, the BWP switching information including a last data burst indicator. The transceiver configured to receive the one or more data bursts and the BWP switching information is further configured to receive, from the BS, the BWP switching information indicating the second BWP. The transceiver configured to receive the one or more data bursts and the BWP switching information is further configured to receive, from the BS, the BWP switching information including a BWP switching command. The transceiver configured to receive the one or more data bursts and the BWP switching information is further configured to receive, from the BS, the first data burst including the BWP switching information and timing information associated with the BWP switching information. The transceiver configured to switch from the communication in the first BWP to the communication in the second BWP is further configured to switch from the communication in the first BWP to the communication in the second BWP based on a comparison between the timing information associated with the BWP switching information and timing information associated with the first data burst. The transceiver is further configured to transmit, to the BS, a capability report indicating a BWP switching duration of the UE. The transceiver configured to receive the one or more data bursts and the BWP switching information is further configured to receive, rom the BS, the BWP switching information indicating information associated with a number of remaining data bursts scheduled for the UE. The transceiver is further configured to receive, from the BS, the BWP switching information indicating a delay for the switching. The transceiver is further configured to transmit, to the BS in the first BWP before the switching, an acknowledgement/negative-acknowledgement (ACK/NACK) for a last data burst of the one or more data bursts. The transceiver configured to switch from the communication in the first BWP to the communication in the second BWP is further configured to switch from the communication in the first BWP to the communication in the second BWP based on a failure of the LBT. The transceiver is further configured to transmit, to the BS in the second BWP, an acknowledgement/negative-acknowledgement (ACK/NACK) for a last data burst of the one or more data bursts. The transceiver is further configured to receive, from the BS in the second BWP, a request for the ACK/NACK; and the transceiver configured to transmit the ACK/NACK is further configured to transmit the ACK/NACK based on the request. The transceiver is further configured to receive, from the BS in the second BWP, a codebook parameter based on the second BWP; and the transceiver configured to transmit the ACK/NACK is further configured to transmit the ACK/NACK based on the received codebook parameter. The transceiver is further configured to receive, from the BS in the second BWP, a request for an acknowledgement/negative-acknowledgement (ACK/NACK) for a last data burst of the one or more data bursts to be transmitted in the first BWP; the transceiver configured to switch from the communication in the first BWP to the communication in the second BWP is further configured to switch from the communication in the first BWP to the communication in the second BWP in response to the request; and the transceiver configured to transmit, to the BS in the first BWP, the ACK/NACK for the last data burst.

Further embodiments of the present disclosure include a user equipment (UE) includes a transceiver configured to communicate, with a base station (BS) in a first bandwidth part (BWP), one or more data bursts; switch the transceiver from communication in the first BWP to a second BWP different from the first BWP autonomously after communicating the one or more data bursts; and communicate, with the BS, a communication signal in the second BWP after the switching.

In some aspect, the UE may also include one or more of the following features. The UE includes may include a processor configured to delay the switching by a delay time period after communicating a last data burst of the one or more data bursts. The transceiver is further configured to receive, from the BS, a configuration indicating the delay time period. The transceiver configured to communicate the one or more data bursts is further configured to receive, from the BS, the one or more data bursts. The switching is further based on a determination that the one or more data bursts are received successfully. The transceiver configured to switch from the communication in the first BWP to the communication in the second BWP is further configured to perform the switch irrespective of whether the one or more data bursts are received successfully. The transceiver configured to communicate the one or more data bursts is further configured to receive, from the BS, information associated with a number of remaining data bursts scheduled for the UE; and the transceiver configured to switch from the communication in the first BWP to the communication in the second BWP is further configured to switch from the communication in the first BWP to the communication in the second BWP based on the received information associated with the number of remaining data bursts. The transceiver configured to communicate the one or more data bursts is further configured to receive, from the BS, information associated with a number of acknowledgements/negative-acknowledgements (ACK/NACKs) expected from the UE; and the transceiver configured to switch from the communication in the first BWP to the communication in the second BWP is further configured to switch from the communication in the first BWP to the communication in the second BWP based on the received information associated with the number of ACK/NACKs expected. The transceiver configured to switch from the communication in the first BWP to the communication in the second BWP is further configured to switch from the communication in the first BWP to the communication in the second BWP based on a determination that there is no remaining transmission scheduled for the UE in the first BWP. The transceiver is further configured to receive from the BS in the second BWP after the switching, a request for an acknowledgement/negative-acknowledgement (ACK/NACK) associated with the one or more data bursts. The transceiver is further configured to transmit, to the BS, the ACK/NACK in response to the request. The transceiver configured to communicate the one or more data bursts is further configured to transmit, to the BS, the one or more data bursts. The transceiver is further configured to transmit, to the BS, a first data burst of the one or more data bursts; and retransmit, to the BS, the first data burst.

Further embodiments of the present disclosure include a base station (BS) includes a transceiver configured to transmit, to a user equipment (UE) in a first bandwidth part (BWP), one or more data bursts and BWP switching information; and a processor configured to monitor for a communication from the UE in at least one of the first BWP or a second BWP different from the first BWP after transmitting the one or more data bursts.

In some aspect, the BS may also include one or more of the following features. The BS includes where the transceiver configured to transmit the one or more data bursts is further configured to transmit, to the UE, a scheduling grant for a first data burst of the one or more data bursts, where at least one of the scheduling grant or the first data burst includes the BWP switching information. The first data burst corresponds to a last data burst of the one or more data bursts. The transceiver configured to transmit the one or more data bursts is further configured to transmit, to the UE, the BWP switching information including a last data burst indicator. The transceiver configured to transmit the one or more data bursts is further configured to transmit, to the UE, the BWP switching information indicating the second BWP. The transceiver configured to transmit the one or more data bursts is further configured to transmit, to the UE, the BWP switching information including a BWP switching command. The transceiver configured to transmit the one or more data bursts is further configured to transmit, to the UE, the BWP switching information including timing information associated with the BWP switching command. The transceiver configured to transmit the one or more data bursts is further configured to transmit, to the UE, the BWP switching information indicating information associated with a number of remaining data bursts scheduled for the UE. The transceiver is further configured to transmit, to the UE, the BWP switching information indicating a BWP switching delay. The transceiver is further configured to determining, by the BS, a schedule for a first data burst of the one or more data bursts based on a communication interruption time associated with a BWP switch. The transceiver is further configured to receive, from the UE, an indication of a BWP switching duration of the UE, where the determining is based on the BWP switching duration of the UE.

Further embodiments of the present disclosure include a base station (BS) includes a transceiver configured to communicate, by a base station (BS) with a user equipment (UE) in a first bandwidth part (BWP), one or more data bursts; and communicate, with the UE in a second BWP different from the first BWP, a communication associated with a first data burst of the one or more data bursts after communicating the one or more data bursts.

In some aspect, the BS may also include one or more of the following features. The BS includes where the transceiver configured to communicate the one or more data bursts is further configured to transmit, to the UE, the one or more data bursts. The transceiver configured to communicate the one or more data bursts is further configured to transmit, to the UE, information associated with a number of remaining data bursts scheduled for the UE. The transceiver configured to communicate the one or more data bursts is further configured to transmit, to the UE, information associated with a number of ACK/NACKs expected from the UE. The transceiver configured to communicate the communication is further configured to communicate the communication based on the monitoring. The processor configured to monitor for the ACK/NACK is further configured to monitor for the ACK/NACK based on a determination that no ACK/NACK for the last data burst is received from the UE in the first BWP. The transceiver configured to communicate the one or more data bursts is further configured to transmit, to the UE, the last data burst based on a retransmission schedule for a first data burst of the one or more data bursts. The transceiver is further configured to transmit, to the UE in the second BWP, a request for the ACK/NACK. The transceiver is further configured to transmit, to the UE in the second BWP, a request for an acknowledgement/negative-acknowledgement (ACK/NACK) for a last data burst of the one or more data bursts to be transmitted in the first BWP; and receive, from the UE in the first BWP, the ACK/NACK for the last data burst in response to the request. The transceiver configured to communicate the one or more data bursts is further configured to receive, from the UE, the one or more data bursts. The transceiver is further configured to transmit, to the UE, a configuration indicating a BWP switching delay.

Further embodiments of the present disclosure include a non-transitory computer-readable medium having program code recorded thereon. The non-transitory computer-readable medium includes code for causing a user equipment (UE) to receive, from a base station (BS) in a first bandwidth part (BWP), one or more data bursts and BWP switching information. The non-transitory computer-readable medium also includes code for causing the UE to switch the transceiver from communication in the first BWP to communication in a second BWP based on the BWP switching information after the one or more data bursts are received. The non-transitory computer-readable medium also includes code for causing the UE to communicate, with the BS, a communication signal in the second BWP after the switching.

In some aspect, the non-transitory computer-readable medium may also include one or more of the following features. The non-transitory computer-readable medium includes where code for causing the UE to receive the one or more data bursts and the BWP switching information is further configured to receive, from the BS, a scheduling grant for a first data burst of the one or more data bursts, where at least one of the scheduling grant or the first data burst includes the BWP switching information. The first data burst corresponds to a last data burst of the one or more data bursts. Code for causing the UE to receive the one or more data bursts and the BWP switching information is further configured to receive, from the BS, the BWP switching information including a last data burst indicator. Code for causing the UE to receive the one or more data bursts and the BWP switching information is further configured to receive, from the BS, the BWP switching information indicating the second BWP. Code for causing the UE to receive the one or more data bursts and the BWP switching information is further configured to receive, from the BS, the BWP switching information including a BWP switching command Code for causing the UE to receive the one or more data bursts and the BWP switching information is further configured to receive, from the BS, the first data burst including the BWP switching information and timing information associated with the BWP switching information. Code for causing the UE to switch from the communication in the first BWP to the communication in the second BWP is further configured to switch from the communication in the first BWP to the communication in the second BWP based on a comparison between the timing information associated with the BWP switching information and timing information associated with the first data burst. The non-transitory computer-readable medium may include code for causing the UE to transmit, to the BS, a capability report indicating a BWP switching duration of the UE. Code for causing the UE to receive the one or more data bursts and the BWP switching information is further configured to receive, rom the BS, the BWP switching information indicating information associated with a number of remaining data bursts scheduled for the UE. The non-transitory computer-readable medium may include code for causing the UE to receive, from the BS, the BWP switching information indicating a delay for the switching. The non-transitory computer-readable medium may include code for causing the UE to transmit, to the BS in the first BWP before the switching, an acknowledgement/ negative-acknowledgement (ACK/NACK) for a last data burst of the one or more data bursts. Code for causing the UE to switch from the communication in the first BWP to the communication in the second BWP is further configured to switch from the communication in the first BWP to the communication in the second BWP based on a failure of the LBT. The non-transitory computer-readable medium may include code for causing the UE to transmit, to the BS in the second BWP, an acknowledgement/negative-acknowledgement (ACK/NACK) for a last data burst of the one or more data bursts. The code for causing the UE to transmit the ACK/NACK is further configured to transmit the ACK/ NACK based on the request. The code for causing the UE to transmit the ACK/NACK is further configured to transmit the ACK/NACK based on the received codebook parameter. The code for causing the UE to switch from the communication in the first BWP to the communication in the second BWP is further configured to switch from the communication in the first BWP to the communication in the second BWP in response to the request.

Further embodiments of the present disclosure include a non-transitory computer-readable medium having program code recorded thereon. The non-transitory computer-readable medium includes code for causing a user equipment (UE) to communicate, with a base station (BS) in a first bandwidth part (BWP), one or more data bursts; code for causing the UE to communication in the first BWP to a second BWP different from the first BWP autonomously after communicating the one or more data bursts. The non-transitory computer-readable medium also includes code for causing the UE to communicate, with the BS, a communication signal in the second BWP after the switching.

In some aspect, the non-transitory computer-readable medium may also include one or more of the following features. The non-transitory computer-readable medium may include code for causing the UE to delay the switching by a delay time period after communicating a last data burst of the one or more data bursts. The non-transitory computer-readable medium may include code for causing the UE to receive, from the BS, a configuration indicating the delay time period. Code for causing the UE to communicate the one or more data bursts is further configured to receive, from the BS, the one or more data bursts. The switching is further based on a determination that the one or more data bursts are received successfully. Code for causing the UE to switch from the communication in the first BWP to the communication in the second BWP is further configured to perform the switch irrespective of whether the one or more data bursts are received successfully. The code for causing the UE to communicate the one or more data bursts is further configured to receive, from the BS, information associated with a number of remaining data bursts scheduled for the UE; and code for causing the UE to switch from the communication in the first BWP to the communication in the second BWP is further configured to switch from the communication in the first BWP to the communication in the second BWP based on the received information associated with the number of remaining data bursts. The code for causing the UE to communicate the one or more data bursts is further configured to receive, from the BS, information associated with a number of acknowledgements/negative-acknowledgements (ACK/NACKs) expected from the UE; and code for causing the UE to switch from the communication in the first BWP to the communication in the second BWP is further configured to switch from the communication in the first BWP to the communication in the second BWP based on the received information associated with the number of ACK/NACKs expected. Code for causing the UE to switch from the communication in the first BWP to the communication in the second BWP is further configured to switch from the communication in the first BWP to the communication in the second BWP based on a determination that there is no remaining transmission scheduled for the UE in the first BWP. The non-transitory computer-readable medium may include code for causing the UE to receive from the BS in the second BWP after the switching, a request for an acknowledgement/negative-acknowledgement (ACK/NACK) associated with the one or more data bursts. The non-transitory computer-readable medium may include code for causing the UE to transmit, to the BS, the ACK/NACK in response to the request. Code for causing the UE to communicate the one or more data bursts is further configured to transmit, to the BS, the one or more data bursts. Code for causing the UE to communicate the one or more data bursts is further configured to transmit, to the BS, a first data burst of the one or more data bursts; and retransmit, to the BS, the first data burst.

Further embodiments of the present disclosure include a non-transitory computer-readable medium having program code recorded thereon. The non-transitory computer-readable medium includes code for causing a base station (BS) to transmit, to a user equipment (UE) in a first bandwidth part (BWP), one or more data bursts and BWP switching information; and code for causing the BS to monitor for a communication from the UE in at least one of the first BWP or a second BWP different from the first BWP after transmitting the one or more data bursts.

In some aspect, the non-transitory computer-readable medium may also include one or more of the following features. The non-transitory computer-readable medium includes where the code for causing the BS to transmit the one or more data bursts is further configured to transmit, to the UE, a scheduling grant for a first data burst of the one or more data bursts, where at least one of the scheduling grant or the first data burst includes the BWP switching information. The first data burst corresponds to a last data burst of the one or more data bursts. The code for causing the BS to transmit the one or more data bursts is further configured to transmit, to the UE, the BWP switching information including a last data burst indicator. The code for causing the BS to transmit the one or more data bursts is further configured to transmit, to the UE, the BWP switching information indicating the second BWP. The code for causing the BS to transmit the one or more data bursts is further configured to transmit, to the UE, the BWP switching information including a BWP switching command. The code for causing the BS to transmit the one or more data bursts is further configured to transmit, to the UE, the BWP switching information including timing information associated with the BWP switching command. The code for causing the BS to transmit the one or more data bursts is further configured to transmit, to the UE, the BWP switching information indicating information associated with a number of remaining data bursts scheduled for the UE. The non-transitory computer-readable medium may include code for causing the BS to transmit, to the UE, the BWP switching information indicating a BWP switching delay. The non-transitory computer-readable medium may include code for causing the BS to determine, a schedule for a first data burst of the one or more data bursts based on a communication interruption time associated with a BWP switch. The determining is based on the BWP switching duration of the UE.

Further embodiments of the present disclosure include a non-transitory computer-readable medium having program code recorded thereon. The non-transitory computer-readable medium includes code for causing a base station (BS) to communicate, with a user equipment (UE) in a first bandwidth part (BWP), one or more data bursts; and code for causing the BS to communicate, with the UE in a second BWP different from the first BWP, a communication associated with a first data burst of the one or more data bursts after communicating the one or more data bursts.

In some aspect, the non-transitory computer-readable medium may also include one or more of the following features. The non-transitory computer-readable medium includes where the code for causing the BS to communicate the one or more data bursts is further configured to transmit, to the UE, the one or more data bursts. The code for causing the BS to communicate the one or more data bursts is further configured to transmit, to the UE, information associated with a number of remaining data bursts scheduled for the UE. The code for causing the BS to communicate the one or more data bursts is further configured to transmit, to the UE, information associated with a number of ACK/NACKs expected from the UE. The code for causing the BS to communicate the communication is further configured to communicate the communication based on the monitoring. The processor configured to monitor for the ACK/NACK is further configured to monitor for the ACK/NACK based on a determination that no ACK/NACK for the last data burst is received from the UE in the first BWP. The code for causing the BS to communicate the one or more data bursts is further configured to transmit, to the UE, the last data burst based on a retransmission schedule for a first data burst of the one or more data bursts. The non-transitory computer-readable medium may include code for causing the BS to transmit, to the UE in the second BWP, a request for the ACK/NACK. The non-transitory computer-readable medium may include code for causing the BS to transmit, to the UE in the second BWP, a request for an acknowledgement/negative-acknowledgement (ACK/NACK) for a last data burst of the one or more data bursts to be transmitted in the first BWP; and code for causing the BS to receive, from the UE in the first BWP, the ACK/NACK for the last data burst in response to the request. The code for causing the BS to communicate the one or more data bursts is further configured to receive, from the UE, the one or more data bursts. The non-transitory computer-readable medium may include code for causing the BS to transmit, to the UE, a configuration indicating a BWP switching delay.

Further embodiments of the present disclosure include a user equipment (UE) including means for receiving, from a base station (BS) in a first bandwidth part (BWP), one or more data bursts and BWP switching information. The user equipment also includes means for switching the transceiver from communication in the first BWP to communication in a second BWP based on the BWP switching information after the one or more data bursts are received. The user equipment also includes means for communicating, with the BS, a communication signal in the second BWP after the switching.

In some aspect, the UE may also include one or more of the following features. The UE includes where means for receiving the one or more data bursts and the BWP switching information is further configured to receive, from the BS, a scheduling grant for a first data burst of the one or more data bursts, where at least one of the scheduling grant or the first data burst includes the BWP switching information. The first data burst corresponds to a last data burst of the one or more data bursts. The means for receiving the one or more data bursts and the BWP switching information is further configured to receive, from the BS, the BWP switching information including a last data burst indicator. The means for receiving the one or more data bursts and the BWP switching information is further configured to receive, from the BS, the BWP switching information indicating the second BWP. The means for receiving the one or more data bursts and the BWP switching information is further configured to receive, from the BS, the BWP switching information including a BWP switching command Means for receiving the one or more data bursts and the BWP switching information is further configured to receive, from the BS, the first data burst including the BWP switching information and timing information associated with the BWP switching information. Means for switching from the communication in the first BWP to the communication in the second BWP is further configured to switch from the communication in the first BWP to the communication in the second BWP based on a comparison between the timing information associated with the BWP switching information and timing information associated with the first data burst. The UE may include means for transmitting, to the BS, a capability report indicating a BWP switching duration of the UE. Means for receiving the one or more data bursts and the BWP switching information is further configured to receive, rom the BS, the BWP switching information indicating information associated with a number of remaining data bursts scheduled for the UE. The UE may include means for receiving, from the BS, the BWP switching information indicating a delay for the switching. The UE may include means for transmitting, to the BS in the first BWP before the switching, an acknowledgement/negative-acknowledgement (ACK/NACK) for a last data burst of the one or more data bursts. The means for switching from the communication in the first BWP to the communication in the second BWP is further configured to switch from the communication in the first BWP to the communication in the second BWP based on a failure of the LBT. The UE may include means for transmitting, to the BS in the second BWP, an acknowledgement/negative-acknowledgement (ACK/NACK) for a last data burst of the one or more data bursts. The means for transmitting the ACK/NACK is further configured to transmit the ACK/NACK based on the request. The means for transmitting the ACK/NACK is further configured to transmit the ACK/NACK based on the received codebook parameter. The means for switching from the communication in the first BWP to the communication in the second BWP is further configured to switch from the communication in the first BWP to the communication in the second BWP in response to the request.

Further embodiments of the present disclosure include a user equipment (UE) including means for communicating, with a base station (BS) in a first bandwidth part (BWP), one or more data bursts. The user equipment also includes means for switching communication in the first BWP to a second BWP different from the first BWP autonomously after communicating the one or more data bursts. The user equipment also includes means for communicating, with the BS, a communication signal in the second BWP after the switching.

In some aspect, the UE may also include one or more of the following features. The UE may include means for delay the switching by a delay time period after communicating a last data burst of the one or more data bursts. The UE may include means for receiving, from the BS, a configuration indicating the delay time period. Means for communicating the one or more data bursts is further configured to receive, from the BS, the one or more data bursts. The switching is further based on a determination that the one or more data bursts are received successfully. Means for switching from the communication in the first BWP to the communication in the second BWP is further configured to perform the switch irrespective of whether the one or more data bursts are received successfully. The means for communicating the one or more data bursts is further configured to receive, from the BS, information associated with a number of remaining data bursts scheduled for the UE; and means for switching from the communication in the first BWP to the communication in the second BWP is further configured to switch from the communication in the first BWP to the communication in the second BWP based on the received information associated with the number of remaining data bursts. The means for communicating the one or more data bursts is further configured to receive, from the BS, information associated with a number of acknowledgements/negative-acknowledgements (ACK/NACKs) expected from the UE; and means for switching from the communication in the first BWP to the communication in the second BWP is further configured to switch from the communication in the first BWP to the communication in the second BWP based on the received information associated with the number of ACK/NACKs expected. Means for switching from the communication in the first BWP to the communication in the second BWP is further configured to switch from the communication in the first BWP to the communication in the second BWP based on a determination that there is no remaining transmission scheduled for the UE in the first BWP. The UE may include means for receiving from the BS in the second BWP after the switching, a request for an acknowledgement/negative-acknowledgement (ACK/NACK) associated with the one or more data bursts. The UE may include means for transmitting, to the BS, the ACK/NACK in response to the request. Means for communicating the one or more data bursts is further configured to transmit, to the BS, the one or more data bursts. Means for communicating the one or more data bursts is further configured to transmit, to the BS, a first data burst of the one or more data bursts; and retransmit, to the BS, the first data burst.

Further embodiments of the present disclosure include a base station (BS) including means for transmitting, to a user equipment (UE) in a first bandwidth part (BWP), one or more data bursts and BWP switching information; and means for monitoring for a communication from the UE in at least one of the first BWP or a second BWP different from the first BWP after transmitting the one or more data bursts.

In some aspect, the BS may also include one or more of the following features. The BS includes where the means for transmitting the one or more data bursts is further configured to transmit, to the UE, a scheduling grant for a first data burst of the one or more data bursts, where at least one of the scheduling grant or the first data burst includes the BWP switching information. The first data burst corresponds to a last data burst of the one or more data bursts. The means for transmitting the one or more data bursts is further configured to transmit, to the UE, the BWP switching information including a last data burst indicator. The means for transmitting the one or more data bursts is further configured to transmit, to the UE, the BWP switching information indicating the second BWP. The means for transmitting the one or more data bursts is further configured to transmit, to the UE, the BWP switching information including a BWP switching command. The means for transmitting the one or more data bursts is further configured to transmit, to the UE, the BWP switching information including timing information associated with the BWP switching command. The means for transmitting the one or more data bursts is further configured to transmit, to the UE, the BWP switching information indicating information associated with a number of remaining data bursts scheduled for the UE. The BS may include means for transmitting, to the UE, the BWP switching information indicating a BWP switching delay. The BS may include means for determining, a schedule for a first data burst of the one or more data bursts based on a communication interruption time associated with a BWP switch. The determining is based on the BWP switching duration of the UE.

Further embodiments of the present disclosure include a base station (BS) including means for communicating, with a user equipment (UE) in a first bandwidth part (BWP), one or more data bursts; and means for communicating, with the UE in a second BWP different from the first BWP, a communication associated with a first data burst of the one or more data bursts after communicating the one or more data bursts.

In some aspect, the BS may also include one or more of the following features. The BS includes where the means for communicating the one or more data bursts is further configured to transmit, to the UE, the one or more data bursts. The means for communicating the one or more data bursts is further configured to transmit, to the UE, information associated with a number of remaining data bursts scheduled for the UE. The means for communicating the one or more data bursts is further configured to transmit, to the UE, information associated with a number of ACK/NACKs expected from the UE. The means for communicating the communication is further configured to communicate the communication based on the monitoring. The means for monitoring the ACK/NACK is further configured to monitor for the ACK/NACK based on a determination that no ACK/NACK for the last data burst is received from the UE in the first BWP. The means for communicating the one or more data bursts is further configured to transmit, to the UE, the last data burst based on a retransmission schedule for a first data burst of the one or more data bursts. The BS may include means for transmitting, to the UE in the second BWP, a request for the ACK/NACK. The BS may include means for transmitting, to the UE in the second BWP, a request for an acknowledgement/negative-acknowledgement (ACK/NACK) for a last data burst of the one or more data bursts to be transmitted in the first BWP; and means for receiving, from the UE in the first BWP, the ACK/NACK for the last data burst in response to the request. The means for communicating the one or more data bursts is further configured to receive, from the UE, the one or more data bursts. The BS may include means for transmitting, to the UE, a configuration indicating a BWP switching delay.

Further embodiments of the present disclosure include a method of wireless communication. The method includes receiving, by a user equipment (UE) from a base station (BS), one or more data bursts and power state switching information based on a first downlink (DL) channel monitoring mode; switching, by the UE, from the first DL channel monitoring mode to a second DL channel monitoring mode different from the first DL channel monitoring mode based on the power state switching information after receiving the one or more data bursts. The method of wireless communication also includes communicating, by the UE with the BS, a communication based on the second DL channel monitoring mode after the switching.

Further embodiments of the present disclosure include a method of wireless communication. The method includes communicating, by a user equipment (UE) with a base station (BS), one or more data bursts based on a first downlink (DL) channel monitoring mode; switching, by the UE, autonomously from the first DL channel monitoring mode to a second DL channel monitoring mode different from the first DL channel monitoring mode after communicating the one or more data bursts. The method of wireless communication also includes communicating, by the UE with the BS, a communication based on the second DL channel monitoring mode after the switching.

Further embodiments of the present disclosure include a method of wireless communication. The method includes transmitting, by a base station (BS) to a user equipment (UE), one or more data bursts and power state switching information based on a first downlink (DL) channel monitoring mode. The method of wireless communication also includes communicating, by the BS with the UE, a communication based on a second DL channel monitoring mode different from the first DL channel monitoring mode after transmitting the one or more data bursts.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE) from a base station (BS) in a first bandwidth part (BWP), one or more data bursts, a last data burst indicator, and BWP switching information;
switching, by the UE, from the first BWP to a second BWP based on the BWP switching information after receiving the one or more data bursts;
communicating, by the UE with the BS, a communication in the second BWP after the switching; and
transmitting, by the UE to the BS based on the last data burst indicator, in the second BWP, an acknowledgement/negative-acknowledgement (ACK/NACK) for a last data burst of the one or more data bursts.

2. The method of claim 1, wherein the receiving includes:
receiving, by the UE from the BS, a scheduling grant for a first data burst of the one or more data bursts, wherein at least one of the scheduling grant or the first data burst includes the BWP switching information.

3. The method of claim 2, wherein the first data burst corresponds to the last data burst of the one or more data bursts.

4. The method of claim 3, wherein the receiving includes:
receiving, by the UE from the BS, the BWP switching information including the last data burst indicator.

5. The method of claim 2, wherein the receiving includes:
receiving, by the UE from the BS, the BWP switching information indicating the second BWP.

6. The method of claim 2, wherein the receiving includes:
receiving, by the UE from the BS, the first data burst including the BWP switching information and timing information associated with the BWP switching information.

7. The method of claim 6, wherein the switching is further based on a comparison between the timing information associated with the BWP switching information and timing information associated with the first data burst.

8. The method of claim 1, wherein the receiving includes:
receiving, by the UE from the BS, the BWP switching information indicating information associated with a number of remaining data bursts scheduled for the UE.

9. The method of claim 1, further comprising:
transmitting, by the UE to the BS in the first BWP before the switching, an acknowledgement/negative-acknowledgement (ACK/NACK) for the last data burst of the one or more data bursts.

10. The method of claim 1, further comprising:
receiving, by the UE from the BS in the second BWP, a request for the ACK/NACK, wherein the transmitting is based on the request.

11. The method of claim 1, wherein the receiving includes:
receiving, by the UE from the BS, a power state switching command including the BWP switching information.

12. A method of wireless communication, comprising:
communicating, by a user equipment (UE) with a base station (BS) in a first bandwidth part (BWP), one or more data bursts, and a last data burst indicator;
switching, by the UE, autonomously from the first BWP to a second BWP different from the first BWP after communicating the one or more data bursts;

communicating, by the UE with the BS, a communication in the second BWP after the switching; and communicating, by the UE with the BS based on the last data burst indicator, in the second BWP, an acknowledgement/negative-acknowledgement (ACK/NACK) for a last data burst of the one or more data bursts.

13. The method of claim 12, wherein the switching includes:

delaying, by the UE, the switching by a delay time period after communicating the last data burst of the one or more data bursts.

14. The method of claim 13, further comprising:

receiving, by the UE from the BS, a configuration indicating the delay time period.

15. The method of claim 12, wherein:

the communicating the one or more data bursts includes:

receiving, by the UE from the BS, information associated with a number of remaining data bursts scheduled for the UE; and the switching is further based on the received information associated with the number of remaining data bursts.

16. The method of claim 12, wherein the communicating the one or more data bursts includes:

transmitting, by the UE to the BS, the one or more data bursts.

17. The method of claim 16, wherein the communicating the one or more data bursts further includes:

retransmitting, by the UE to the BS, a first data burst of the one or more data bursts.

18. The method of claim 12, wherein the switching is further based on a determination that there is no remaining transmission scheduled for the UE in the first BWP.

19. A user equipment (UE) comprising:

a transceiver configured to:

receive, from a base station (BS) in a first bandwidth part (BWP), one or more data bursts, a last data burst indicator, and BWP switching information;

switch the transceiver from communication in the first BWP to communication in a second BWP based on the BWP switching information after the one or more data bursts are received;

communicate, with the BS, a communication signal in the second BWP after the switching; and transmit, by the UE to the BS based on the last data burst indicator, in the second BWP, an acknowledgement/ negative-acknowledgement (ACK/NACK) for a last data burst of the one or more data bursts.

20. The UE of claim 19, wherein the transceiver configured to receive the one or more data bursts and the BWP switching information is further configured to:

receive, from the BS, a scheduling grant for a first data burst of the one or more data bursts, wherein at least one of the scheduling grant or the first data burst includes the BWP switching information.

21. The UE of claim 20, wherein:

the transceiver configured to receive the one or more data bursts and the BWP switching information is further configured to:

receive, from the BS, the first data burst including the BWP switching information and timing information associated with the BWP switching information; and the transceiver configured to switch from the communication in the first BWP to the communication in the second BWP is further configured to:

switch from the communication in the first BWP to the communication in the second BWP based on a comparison between the timing information associated with the BWP switching information and timing information associated with the first data burst.

22. The UE of claim 19, wherein the transceiver configured to receive the one or more data bursts and the BWP switching information is further configured to:

receive, from the BS, the BWP switching information indicating information associated with a number of remaining data bursts scheduled for the UE.

23. The UE of claim 19, wherein the transceiver is further configured to:

transmit, to the BS in the first BWP before the switching, an acknowledgement/negative-acknowledgement (ACK/NACK) for the last data burst of the one or more data bursts.

24. A user equipment (UE) comprising:

a transceiver configured to:

communicate, with a base station (BS) in a first bandwidth part (BWP), one or more data bursts and a last data burst indicator;

switch the transceiver from communication in the first BWP to a second BWP different from the first BWP autonomously after communicating the one or more data bursts;

communicate, with the BS, a communication signal in the second BWP after the switching; and communicate, with the BS based on the last data burst indicator, in the second BWP, an acknowledgement/ negative-acknowledgement (ACK/NACK) for a last data burst of the one or more data bursts.

25. The UE of claim 24, further comprising:

a processor configured to delay the switching by a delay time period after communicating the last data burst of the one or more data bursts.

26. The UE of claim 24, wherein:

the transceiver configured to communicate the one or more data bursts is further configured to:

receive, from the BS, information associated with a number of remaining data bursts scheduled for the UE; and the transceiver configured to switch from the communication in the first BWP to the communication in the second BWP is further configured to:

switch from the communication in the first BWP to the communication in the second BWP based on the received information associated with the number of remaining data bursts.

27. The UE of claim 24, wherein the transceiver configured to communicate the one or more data bursts is further configured to:

transmit, to the BS, the one or more data bursts; and retransmit, to the BS, a first data burst of the one or more data bursts.

28. The UE of claim 24, wherein the transceiver configured to switch from the communication in the first BWP to the communication in the second BWP is further configured to:

switch from the communication in the first BWP to the communication in the second BWP based on a determination that there is no remaining transmission scheduled for the UE in the first BWP.

\* \* \* \* \*